(12) United States Patent
Kitamura

(10) Patent No.: US 9,497,067 B2
(45) Date of Patent: Nov. 15, 2016

(54) ADDRESS DETERMINATION APPARATUS, COMMUNICATION SYSTEM, ADDRESS DETERMINATION METHOD, AND PROGRAM

(75) Inventor: Hiroshi Kitamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1100 days.

(21) Appl. No.: 12/866,220

(22) PCT Filed: Feb. 6, 2009

(86) PCT No.: PCT/JP2009/052018
§ 371 (c)(1),
(2), (4) Date: Aug. 4, 2010

(87) PCT Pub. No.: WO2009/104482
PCT Pub. Date: Aug. 27, 2009

(65) Prior Publication Data
US 2011/0004673 A1   Jan. 6, 2011

(30) Foreign Application Priority Data
Feb. 19, 2008  (JP) ................................. 2008-037772

(51) Int. Cl.
*H04W 4/00* (2009.01)
*H04L 29/12* (2006.01)

(52) U.S. Cl.
CPC ..... *H04L 29/1232* (2013.01); *H04L 29/12915* (2013.01); *H04L 61/2015* (2013.01);
(Continued)

(58) Field of Classification Search
CPC ................... H04L 61/2046; H04L 29/12264; H04L 61/2092
USPC ........................................................ 709/220
See application file for complete search history.

(56) References Cited

U.S. PATENT DOCUMENTS

| | | | |
|---|---|---|---|
| 5,724,510 A * | 3/1998 | Arndt et al. | 709/220 |
| 2004/0081122 A1* | 4/2004 | Koodli et al. | 370/329 |
| 2010/0316019 A1* | 12/2010 | Liu et al. | 370/331 |

FOREIGN PATENT DOCUMENTS

| | | |
|---|---|---|
| JP | 2000316002 A | 11/2000 |
| JP | 2000316016 A | 11/2000 |

(Continued)

OTHER PUBLICATIONS

International Search Report for PCT/JP2009/052018 mailed Apr. 21, 2009.
(Continued)

*Primary Examiner* — Tonia L Dollinger
*Assistant Examiner* — Kishin G Belani

(57) ABSTRACT

An address determination apparatus that determines a valid address that a communication apparatus designates as the address at which a communication starts for indicating the origin of a transmission includes: a duplicate valid address determination means that selects a tentative address, and by an inquiry on a network, determines the existence of a valid address that duplicates the tentative address in the network; a memory means that stores the tentative address as an uncertain address when it is determined by the duplicate valid address determination means that there is no valid address that duplicates the tentative address in the network; and an address determination means that, when a communication apparatus begins communication that designates the address at which the transmission originates, determines the uncertain address that is stored in the memory means as the valid address designated as the address at which the transmission of the communication apparatus originates.

12 Claims, 28 Drawing Sheets

(52) U.S. Cl.
CPC ....... *H04L61/2092* (2013.01); *H04L 61/6059* (2013.01); *H04L 29/12273* (2013.01); *H04L 61/2053* (2013.01)

(56) References Cited

FOREIGN PATENT DOCUMENTS

| JP | 2001202344 A | 7/2001 | | |
|---|---|---|---|---|
| JP | 2006025389 A | 1/2006 | | |
| JP | 2007166069 A | 6/2007 | | |
| WO | PCT/CN2008/000088 | * | 1/2008 | ............... 370/331 |

OTHER PUBLICATIONS

S. Thomson et al., "IPv6 Stateless Address Autoconfiguration", Network Working Group, RFC4862, Sep. 2007.

N. Moore et al., "Optimistic Duplicate Address Detection (DAD) for IPv6", Network Working Group, RFC4429, Apr. 2006.

* cited by examiner

Fig.8

| assigned address 1131 | |
|---|---|
| IP address (1131A) | address states (1131B) |
| X1 | Invalid |
| X2 | Tentative |
| X3 | Uncertain |
| X4 | Valid |
| ⋮ | ⋮ |

# ADDRESS DETERMINATION APPARATUS, COMMUNICATION SYSTEM, ADDRESS DETERMINATION METHOD, AND PROGRAM

This application is the National Phase of PCT/JP2009/052018, filed Feb. 6, 2009, which claims the benefits of priority based on JP-A-2008-037772 for which application was submitted on Feb. 19, 2008 and incorporates all of the disclosures of that application.

TECHNICAL FIELD

The present invention relates to a technique for generating addresses in a communication apparatus that communicates by way of a network.

BACKGROUND ART

When IP addresses are dynamically set in each communication apparatus that carries out communication by way of an IP (Internet Protocol) network such as the Internet, the danger exists that the timing of IP address requests will cause duplicate IP addresses to be set by mistake. To prevent such problems, a client implements a process called DAD (Duplicate Address Detection) as disclosed in RFC 4862: IPv6 Stateless Address Auto-Configuration URL:http://www.ietf.org/rfc/rfc4862.txt before actually setting an address.

In the DAD process, the client first takes one of the invalid addresses that are recognized as not being set to any other communication apparatus on the network as a setting candidate tentative address as shown in FIG. 1.

As shown in FIG. 2, the client then transmits NS (Neighbor Solicitation) message M1 that inquires whether a valid address that has been set and that duplicates a tentative address (for example, "Address X") exists in the network. If there is no reply from another communication apparatus indicating that a duplicate address exists within a predetermined time interval, the uniqueness of the tentative address is confirmed, and the client therefore sets the tentative address as a valid address in that client, as shown in FIG. 1. The dotted line in FIG. 2 indicates that there is no reply to the NS messages from each client.

As shown in FIG. 2, after a valid address has been set, the client is able to designate destinations and communicate with other clients that have set valid addresses. "NS(src=::)" in FIGS. 2-5 indicates an NS message for DAD, and "NS(src≠::)" indicates an NS message for resolving an L2 address. In FIGS. 2-5, normal arrows between nodes indicate transmission of NS messages for DAD processing, and blank arrows indicate the transmission of messages for resolving L2 addresses.

As shown in FIG. 3, a case is here considered in which client C1 attempts to acquire tentative address "X," but a valid address that is the same as address "X" has already been set to client C2 in the network. In this case, client C2 returns NA (Neighbor Advertisement) message M3 indicating that a duplicate address exists in response to NS message M2 from client C1. Client C1, having received M3, cancels tentative address "X" and the DAD fails.

Alternatively, in another case as shown in FIG. 4, client C1 transmits NA message M4 for a DAD process regarding tentative address "X," and following reception of M4, another client C3 at a delayed time carries out a DAD process to acquire the same valid address as tentative address "X." Here, NS message M5 of later client C3 in some cases arrives at client C1 after the transmission of M4 by earlier client C1 but before the passage of the predetermined time interval that determines the lack of a reply. At such times, earlier client C1 that has received M5 determines that the DAD process has failed, while the later client C3 wins from behind and is able to set address "X" as a valid address to client C3 itself.

As explained with reference to FIG. 3 and FIG. 4, implementation of the DAD process prevents the setting of duplicate valid addresses on a network.

Nevertheless, the existence of low-performance nodes or nodes that have undergone protocol installation by various methods must be assumed on a network, and in duplicate verification, sufficient time is required to enable reply by any kind of node. In a typical communication environment that uses Ethernet, one second is assigned to this verification time. Accordingly, when a node is newly using an address, this address cannot be used without first waiting for the one-second duplicate verification. The one-second time interval required for the DAD process is a long time interval that cannot be ignored in a typical communication environment.

Alternatively, as shown in FIG. 5, after client C1 has transmitted NS message M6 and before client C3 receives M6, C3 may in some cases transmit later NS message M7. In this case, client C1 receives M7 within the predetermined time interval for determining the absence of duplication, the DAD process fails, and client C3 similarly receives M6 within the predetermined time interval, whereby both DAD processes fail. As a result, client C1 or C3 again implements DAD, expending more time.

This results in a time-consuming DAD, and a communication apparatus requires more time to set a valid address.

As disclosed in RFC 4429: Optimistic Duplicate Address Detection (DAD) for IPv6 URL:http://www.ietf.org/rfc/rfc4429.txt, there is a method for shortening the time until an address is set in which a communication apparatus carries out an optimistic DAD process. An optimistic DAD process is a method that takes advantage of the vastness of IP address space in IPv6 (Internet Protocol Version 6) and the extremely low possibility of conflicts. This method advances the process by eliminating the DAD process or by, while allowing the existence of the DAD process, assuming that conflicts will not occur. Then, if a conflict should subsequently be discovered, a node devises remedial measures for the process based on the assumption that the process was carried out prior to the time of the discovery.

Alternatively, as disclosed in JP-A-2007-166069, there is also a method for shortening the time until an address is set in which a DHCP server, when its own IP address is duplicated by a tentative address, changes its own IP address to an address that is outside the range of the pooled address space.

DISCLOSURE OF THE INVENTION

However, in the method of Non-Patent Document 2, an optimistic address is not necessarily a unique address, and an address that duplicates an optimistic address is detected in some cases. In such cases, correction is time consuming.

In the method disclosed in Patent Document 1, the DAD process itself cannot be omitted.

The problem therefore remains that the time until a unique address is set to a communication apparatus in a network still cannot be sufficiently reduced.

In view of the above-described problems, it is an object of the present invention to provide a technique for shortening the time interval for setting a unique address to a communication apparatus in a network.

To achieve the above-described object, the address determination apparatus of the present invention is an address determination apparatus that determines a valid address that a communication apparatus that is connected to a network designates as the address at which a communication starts for indicating the origin of a transmission, the address determination apparatus including:

duplicate valid address determination means that selects a tentative address and, by submitting an inquiry on the network, determines the existence or absence of a valid address that duplicates the tentative address;

memory means that, when the duplicate valid address determination means determines that a valid address that duplicates the tentative address does not exist in the network, stores the tentative address as an uncertain address;

address determination means that, when the communication apparatus begins communication that designates the address at which the communication originated, determines the uncertain address that was stored in the memory means as the valid address that is designated as the address at which the transmission of the communication apparatus originates.

The communication system of the present invention includes a communication apparatus that is connected to a network and an address determination apparatus that determines a valid address that the communication apparatus designates as the transmission origin, wherein the address determination apparatus generates a tentative address, determines whether there is a valid address in the network that duplicates the tentative address, and upon determining that there is no valid address that duplicates the tentative address, stores the tentative address as an uncertain address in a memory means; the communication apparatus, when starting communication that designates the address of the transmission origin, transmits a message requesting a valid address to the address determination apparatus; the address determination apparatus, upon receiving the message requesting a valid address from the communication apparatus, determines the uncertain address that was read from the memory means as a valid address that is set in the communication apparatus and transmits to the communication apparatus an address transfer message indicating the valid address; and the communication apparatus receives the address transfer message from the address determination apparatus and sets the valid address indicated by the address transfer message to the valid address designated as the address at which the transmission of the communication apparatus originates.

The address determination method of the present invention is a method of determining a valid address that a communication apparatus that is connected to a network designates as the address at which a communication starts for indicating the origin of a transmission, and includes steps of: generating a tentative address, and by carrying out an inquiry on the network, determining whether there is a valid address that duplicates the tentative address in the network; when it is determined that there is no valid address that duplicates the tentative address on the network, storing the tentative address in a memory means as an uncertain address; and when the communication apparatus starts communication that designated an address at which the transmission originates, determining the uncertain address that was stored in the memory means as the valid address designated as the transmission origin of the communication apparatus.

The program of the present invention is a program for causing a computer to execute a process of determining a valid address that a communication apparatus that is connected to a network designates as the address at which a communication starts for indicating the origin of a transmission, the program causing the computer to execute: a duplicate address determination procedure of generating a tentative address, and by carrying out an inquiry on the network, determining whether there is a valid address that duplicates the tentative address in the network; a storage procedure of, when it is determined by the duplicate address determination procedure that there is no valid address that duplicates the tentative address in the network, storing the tentative address as an uncertain address in a memory means; and an address determination procedure of when the communication apparatus begins communication that designates the transmission origin address, determining the uncertain address that was stored in the memory means as the valid address that is designated as the address at which the transmission of the communication apparatus originates.

The present invention enables the shortening of the time for setting an address that is unique in a network to a communication apparatus.

BRIEF DESCRIPTION OF THE DRAWINGS

FIG. 8 shows the configuration of an assigned address of the first exemplary embodiment;

BEST MODE FOR CARRYING OUT THE INVENTION

First Exemplary Embodiment

The first exemplary embodiment of the present invention is next described with reference to the accompanying drawings.

Figure 1:
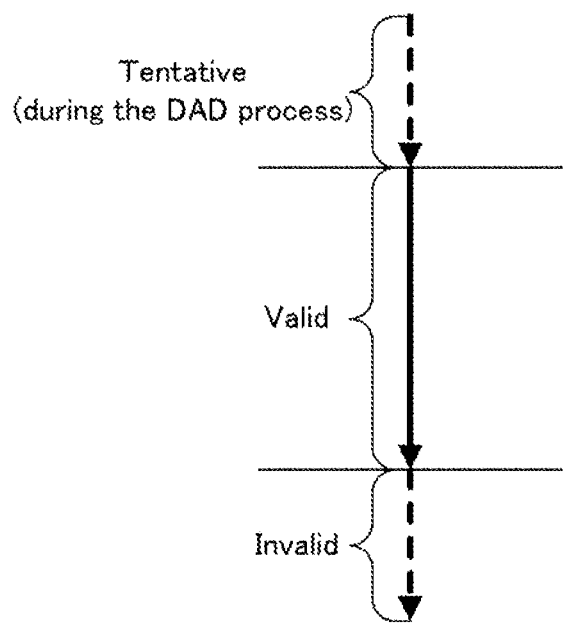
FIG. 1 shows in a time-series order the transition of address state of IP addresses in a typical communication system.
Figure 2:
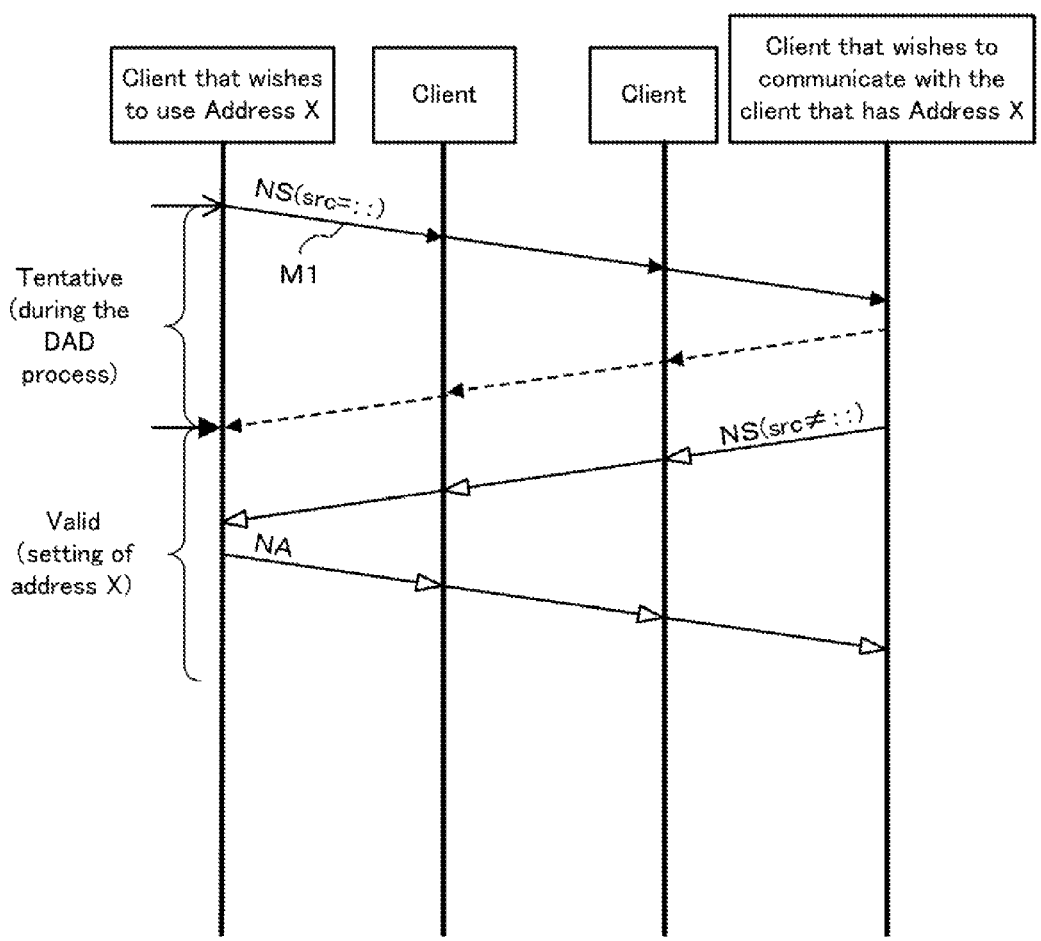
FIG. 2 is a sequence chart showing in time-series order an example of the flow of messages in a typical communication system.
Figure 3:
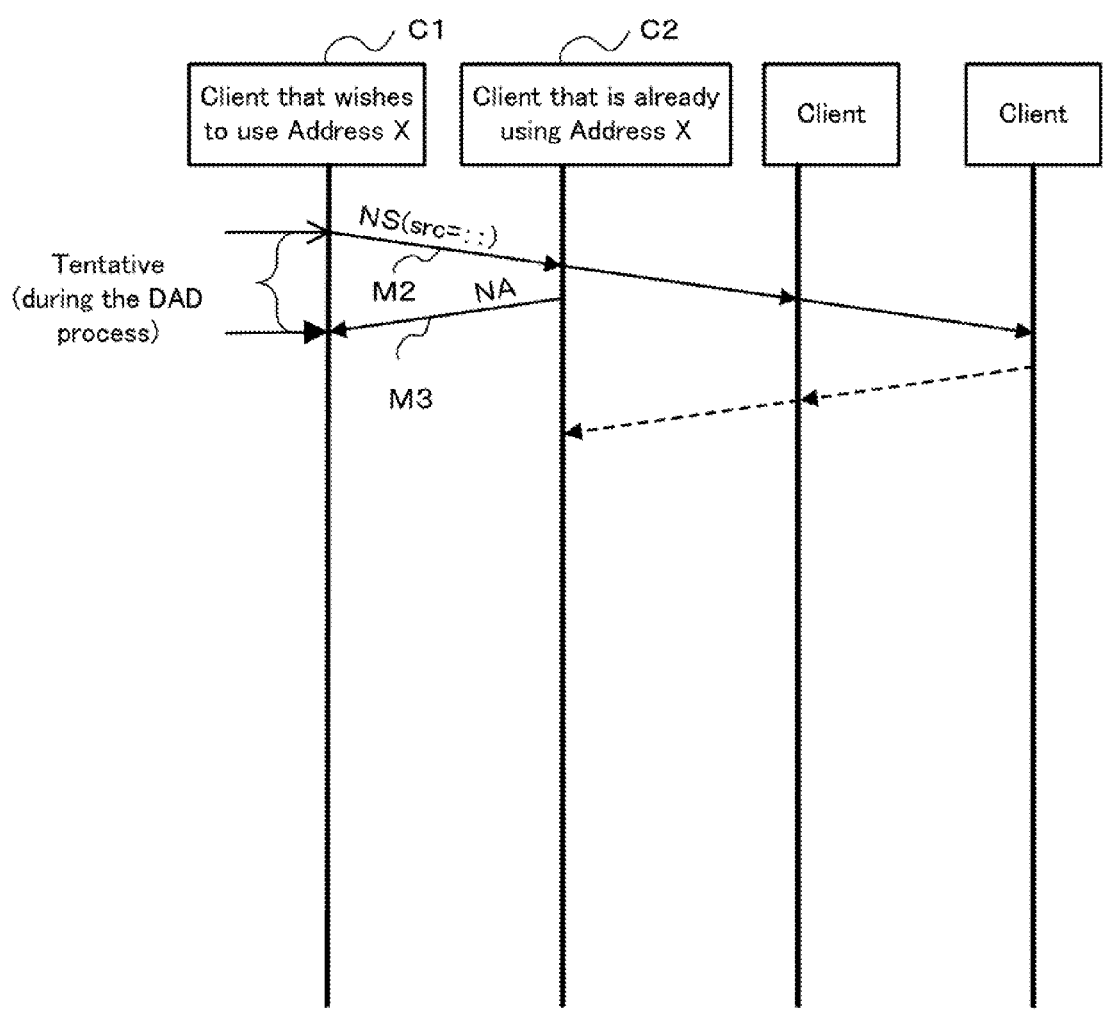
FIG. 3 is a sequence chart showing in time-series order an example of the flow of messages in a typical communication system.
Figure 4:
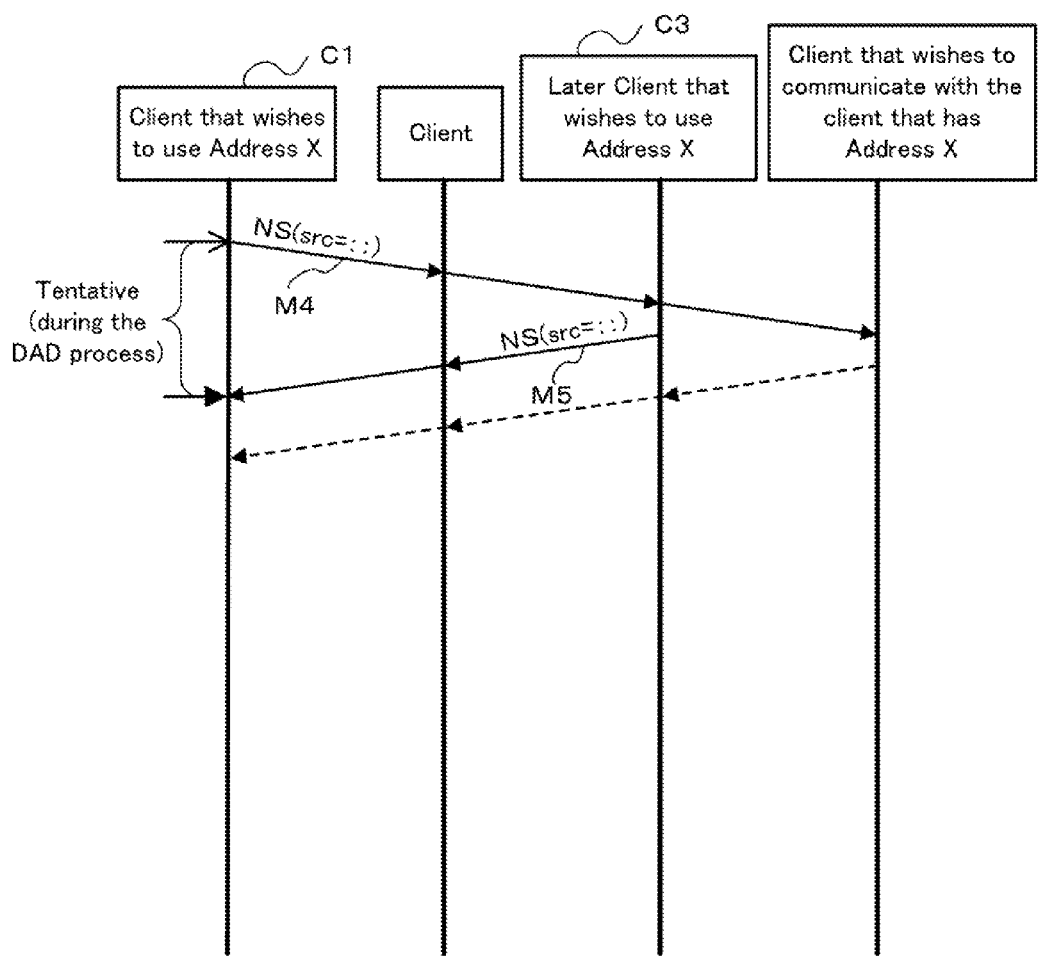
FIG. 4 is a sequence chart showing in time-series order an example of the flow of messages in a typical communication system.
Figure 5:
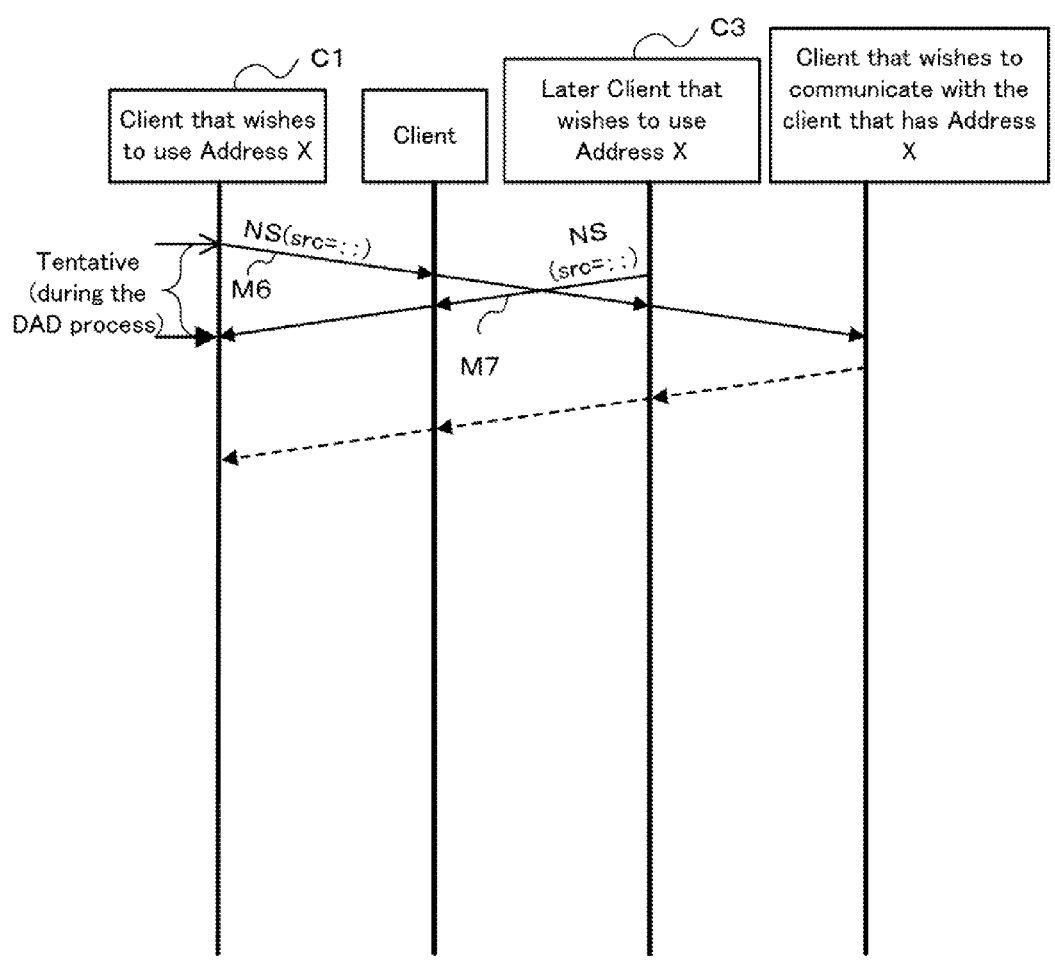
FIG. 5 is a sequence chart showing in time-series order an example of the flow of messages in a typical communication system.
Figure 6:
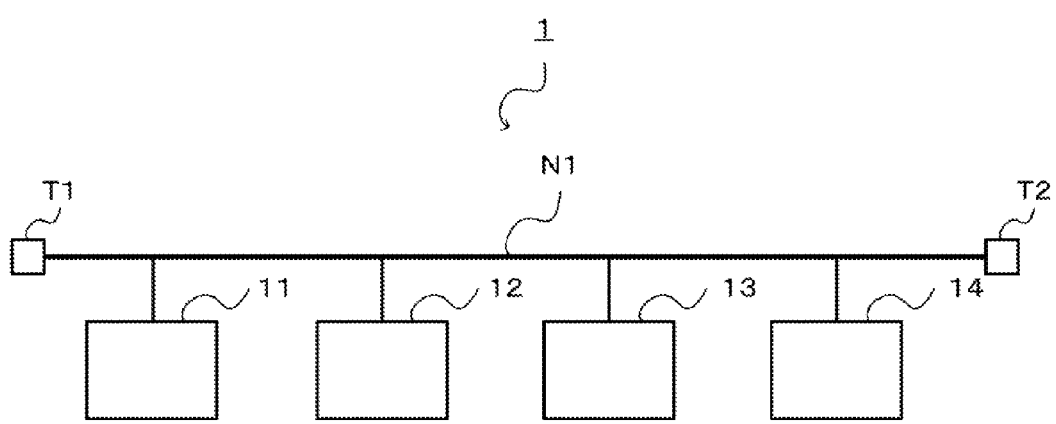
FIG. 6 is an overall view showing the configuration of a communication system of the first exemplary embodiment.

FIG. 6 is an overall view of communication system 1 of the present exemplary embodiment. Communication system 1 uses an Ethernet LAN (Local Area Network) that is constructed in a predetermined area. Referring to FIG. 6, communication system 1 includes nodes 11, 12, 13 and 14, and these nodes 11-14 are connected to network N1 in bus form.

Terminators T1 and T2 are provided at the ends of network N1.

The topology is of course not limited to the bus form and other types of topology such as a ring or star may also be used.

Node 11 is a communication apparatus that communicates with other communication apparatuses by way of network N1. Node 11 generates and stores an uncertain address in advance, and sets this uncertain address as a valid address in its own node. Node 11 further transmits messages indicating the same address as this uncertain address in accordance with requests from other nodes. For example, node 11 is a personal computer having a communication capability.

An uncertain address is an address that is verified to be a unique address in a network among tentative addresses dynamically generated by a communication apparatus in the network, and although intended to be set as a unique valid address to a communication apparatus, is an address in an uncertain state that has not yet been set.

In contrast, a tentative address is an address that has not been verified as a unique address in the network and has not yet been set to a communication apparatus. A tentative address is selected (generated) as a candidate of a valid address from among invalid addresses. The existence of a valid address in the network that duplicates a tentative address is determined by means of a DAD process, and when a duplicate valid address is determined to exist, the tentative address is canceled and reverts to an invalid address. When a valid address that duplicates the tentative address is determined not to exist in the network, uniqueness is verified and the tentative address therefore is set as a valid address to a communication apparatus.

A valid address is a unique address in a network that is assigned (set) to the communication interface of a communication apparatus. By setting a valid address to a communication apparatus, the communication apparatus can begin communication that designates the address where its own transmission originates.

An invalid address is an address for which uniqueness in the network has not been verified and that has not been set to a communication apparatus.

In the present exemplary embodiment, IPv6 (Internet Protocol Version 6) is used as the communication protocol, and valid addresses, invalid addresses, tentative addresses, and uncertain addresses are IP addresses in IPv6.

IPv6 may incorporate IPv4 (Internet Protocol Version 4), or IPv4 may be used.

Figure 7:
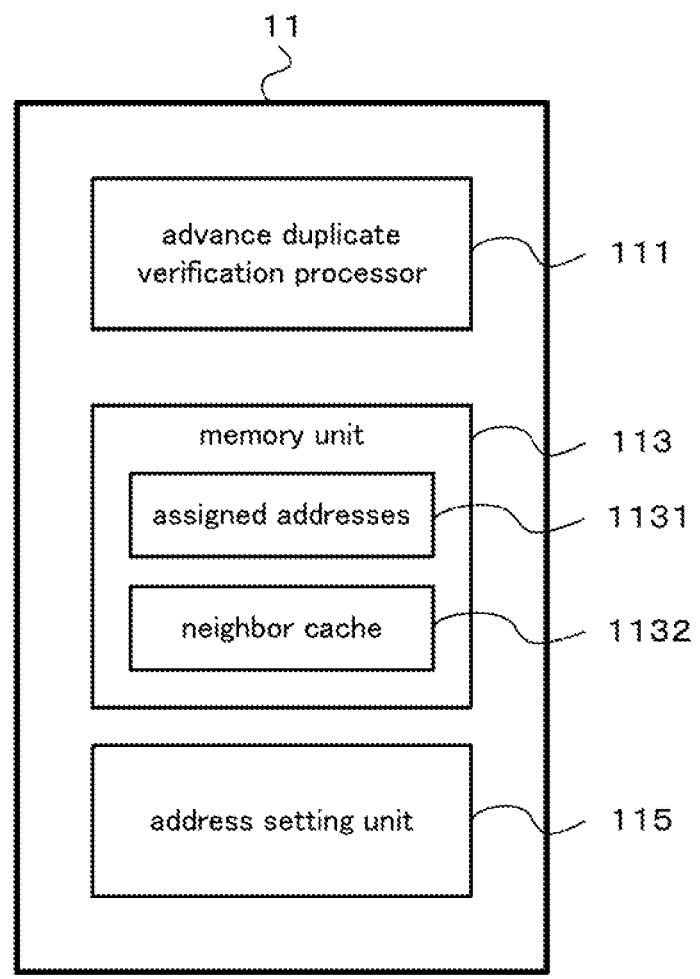
FIG. 7 is a block diagram showing the configuration of a communication apparatus of the first exemplary embodiment.

The configuration of node 11 is next described with reference to FIG. 7. FIG. 7 is a block diagram showing the configuration of node 11. Referring to FIG. 7, node 11 includes: advance duplicate verification processor 111, memory unit 113, and address setting unit 115.

Advance duplicate verification processor 111 generates a tentative address and, by executing a DAD process, determines whether there is a valid address that duplicates the generated tentative IP address on network N1. If a valid address that duplicates the tentative address is determined not to exist, advance duplicate verification processor 111 stores the generated tentative address in memory unit 113 as an uncertain address.

Advance duplicate verification processor 111 may here determine the existence of a duplicate valid address by a process other than the DAD of IPv6. For example, when IPv4 is used, advance duplicate verification processor 111 verifies that a duplicate address does not exist by transmitting a Gratuitous ARP. Alternatively, a DAD of IPv4 has also been offered and is known to be installed in some OS (Operating Systems) such as Windows Vista. This IPv4 DAD process may of course be carried out by advance duplicate verification processor 111.

Memory unit 113 includes assigned addresses 1131 and neighbor cache 1132. Memory unit 113 is memory such as RAM (Random Access Memory).

Figure 8:
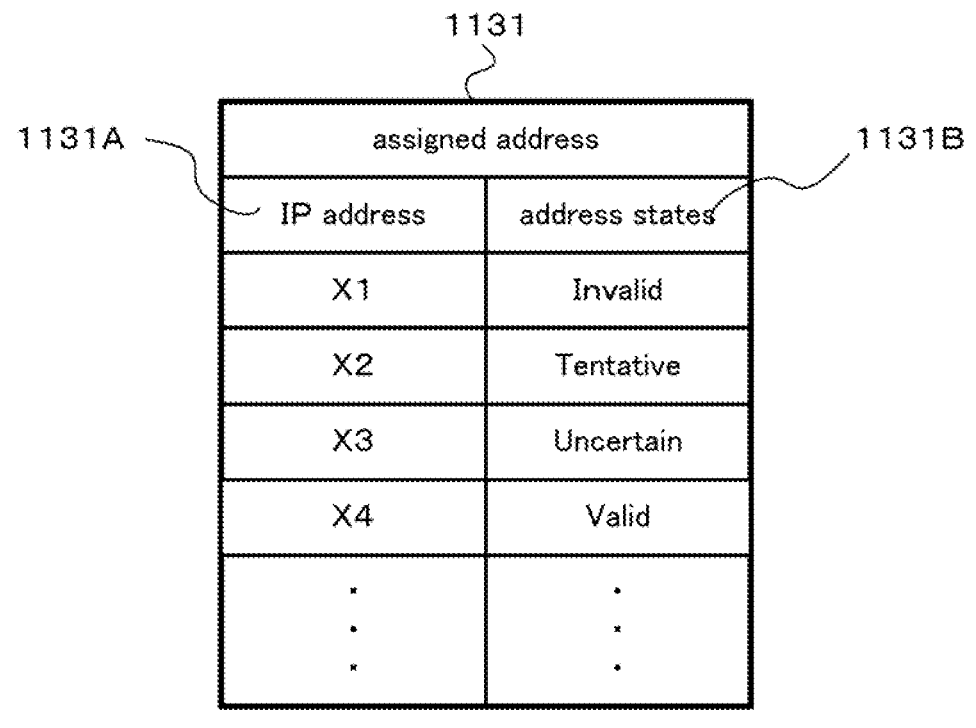

Assigned addresses 1131 are next described with reference to FIG. 8. FIG. 8 shows an example of the configuration of assigned addresses 1131. Assigned addresses 1131 store each of addresses 1131A in the assigned address range in network N1 in association with states 1131B of these addresses.

Referring to FIG. 8, assigned addresses 1131 store the content of each item of IP addresses 1131A and address states 1131B. IP addresses 1131A are IP addresses assigned to network N1. Address states 1131B are states of corresponding assigned addresses 1131A. Each address assumes one of four states: Tentative address, Uncertain address, Valid address, or Invalid address. Address states 1131B are any of "Tentative," "Uncertain," "Valid," and "Invalid" for each of IP addresses 1131A. For example, node 11 initially makes all address states 1131B of assigned IP addresses 1131A "Invalid" (Invalid addresses), and upon carrying out a DAD process, makes address state 1131B of any IP address 1131A "Tentative" (tentative address). When the DAD process is successful, node 11 makes the address state of that address transition to "Uncertain" (uncertain address), and when the DAD process fails, the state returns to "Invalid" (invalid address). When an uncertain address "Uncertain" is set as a valid address, node 11 makes the address state of that address "Valid."

Returning to FIG. 7, neighbor cache 1132 is a table in which the valid addresses of nodes on network N1 are placed in association with the link layer addresses of these nodes. The link layer addresses are, for example, MAC (Media Access Control) addresses.

When communication that designates the address of the transmission origin begins by way of network N1, address setting unit 115 determines (sets) an uncertain address stored in memory unit 113 as a valid address that is designated as the transmission origin of the node (11). After setting the valid address, address setting unit 115 transmits to the node that wishes to start communication a message requesting a link layer (MAC) address of that node. Upon receiving a message indicating the MAC address from a partner, address setting unit 115 updates neighbor cache 1132 based on the MAC address and begins communication.

When there is a request from another node indicating the desire to acquire an IP address, address setting unit 115 selects an uncertain address that is stored in memory unit 113 and determines this uncertain address as the valid address of that node. Address setting unit 115 then transmits to that node a message indicating the valid address (uncertain address) that has been determined. After transmitting the message, address setting unit 115 makes the uncertain address relating to the message an invalid address.

The node that receives the message sets the uncertain address relating to the message the valid address of its own node. The details of this process are described hereinbelow.

Address setting unit 115 further receives NS (Neighbor Solicitation) messages that are inquiries from other nodes regarding addresses. NS messages include messages inquiring whether there is a valid address that duplicates a tentative address (for a DAD process) and messages requesting transmission of a MAC address for starting communication that designates mutual destinations with a partner, i.e., for L2 (Layer-2) address resolution.

When the received NS message is a message for a DAD process, and moreover, duplicates either a tentative address or uncertain address, address setting unit 115 transmits an NA (Neighbor Advertisement) message indicating that there is a duplicate address.

On the other hand, when the message is for L2 address resolution and a valid address is set to that node (11), address setting unit 115 transmits an NA message indicating the MAC address of its own node.

In this way, advance duplicate verification processor 111 carries out a DAD process before setting a valid address to its own node (11), and stores a tentative address that is verified to be unique in network N1 in memory unit 113 as an uncertain address. When a valid address becomes necessary for its own node (11), node 11 reads the uncertain address that is stored in memory unit 113 and sets the address as a valid address to itself without carrying out a DAD process.

Instead of carrying out a DAD process after the setting of a valid address becomes necessary as in a communication apparatus of the related art, node 11 of the present exemplary embodiment finishes the DAD process as described above before setting of a valid address becomes necessary. As a result, node 11 does not have to carry out the DAD process when beginning communication, whereby node 11 enables a reduction of the time for setting a valid address to a communication apparatus.

The communication apparatus of the related art updates neighbor cache 1132 based on the MAC address indicated by an NA message from a node that is the object of communication. As a result, when the apparatus that dynamically generates a tentative address differs from the apparatus that uses the tentative address as a valid address (IP address), the information of neighbor cache 1132 (the correspondence relation between IP addresses and MAC addresses) is not coordinated and communication becomes confused. As a result, the apparatus that dynamically generates a tentative address must be the same as the apparatus that uses this tentative address.

In contrast, node 11 of the present exemplary embodiment does not return an NA message indicating a MAC address as long as a valid address has not been set, even if an uncertain address has been saved. As a result, neighbor cache 1132 is not updated and the uncertain address that was generated can be passed on to another node. Accordingly, the time for setting the valid address of another communication apparatus can be shortened, and the time for setting valid addresses is shortened for the entire communication system 1 that includes node 11.

Figure 9:
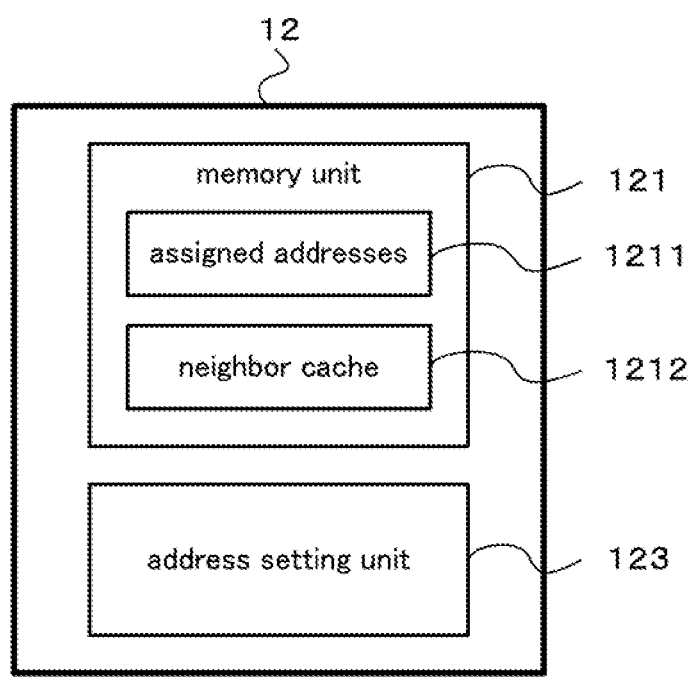
FIG. 9 is a block diagram showing the configuration of a communication apparatus of the first exemplary embodiment.

The configuration of nodes 12-14 is next described with reference to FIG. 9. Nodes 12-14 are communication apparatuses that perform communication with other communication apparatuses by way of network N1. FIG. 9 is a block diagram showing the configuration of node 12. Referring to FIG. 9, node 12 includes memory unit 121 and address setting unit 123.

Memory unit 121 includes assigned addresses 1211 and neighbor cache 1212. These constructions are identical to assigned address 1131 and neighbor cache 1132. However, in contrast to assigned addresses 1131 shown in FIG. 8, address states 1131B do not become the "Uncertain" state.

Address setting unit 123 receives a message indicating an uncertain address from node 11, and sets the uncertain address relating to the message as the valid address of its own node. For example, address setting unit 123 transmits a message by broadcast indicating that an IP address is desired. Upon receiving a message indicating an uncertain address from node 11, address setting unit 123 sets the address that was received as the valid address of its own node without carrying out a DAD process. When a message indicating an uncertain address cannot be received from node 11, address setting unit 123 carries out a DAD process, generates a valid address and sets the valid address to itself.

If address setting unit 123 receives an NS message from another node and the tentative address indicated by the message matches the valid address of its own node, address setting unit 123 returns an NA message indicating that there is a duplicate address.

The configuration of nodes 13 and 14 are the same as node 12.

In this way, an IP address received from node 11 is an uncertain address verified to be unique by node 11. As a result, if a message is received indicating an uncertain address, nodes 12-14 of the present exemplary embodiment do not need to perform a DAD process, and nodes 12-14 can therefore shorten the time for setting a valid address to communication apparatuses.

According to the present exemplary embodiment, node 11 generates a tentative address, determines whether a valid address that duplicates the tentative address exists in network N1, and when there is no duplicate address, stores the tentative address as an uncertain address.

Node 11 then sets the uncertain address that was stored as the valid address of its own node. Nodes 12-14 further transmit messages indicating the desire to acquire IP addresses, and node 11 transmits a message indicating an uncertain address to node 14. Nodes 12-14 set the uncertain address relating to the received message as the valid address of its own node.

The need to carry out a DAD process when setting valid addresses to nodes 11-14 is therefore eliminated, and the time until valid addresses are set to nodes 11-14 is shortened.

The operation of communication system 1 of the present exemplary embodiment is next described with reference to FIGS. 10-16.

Figure 10:
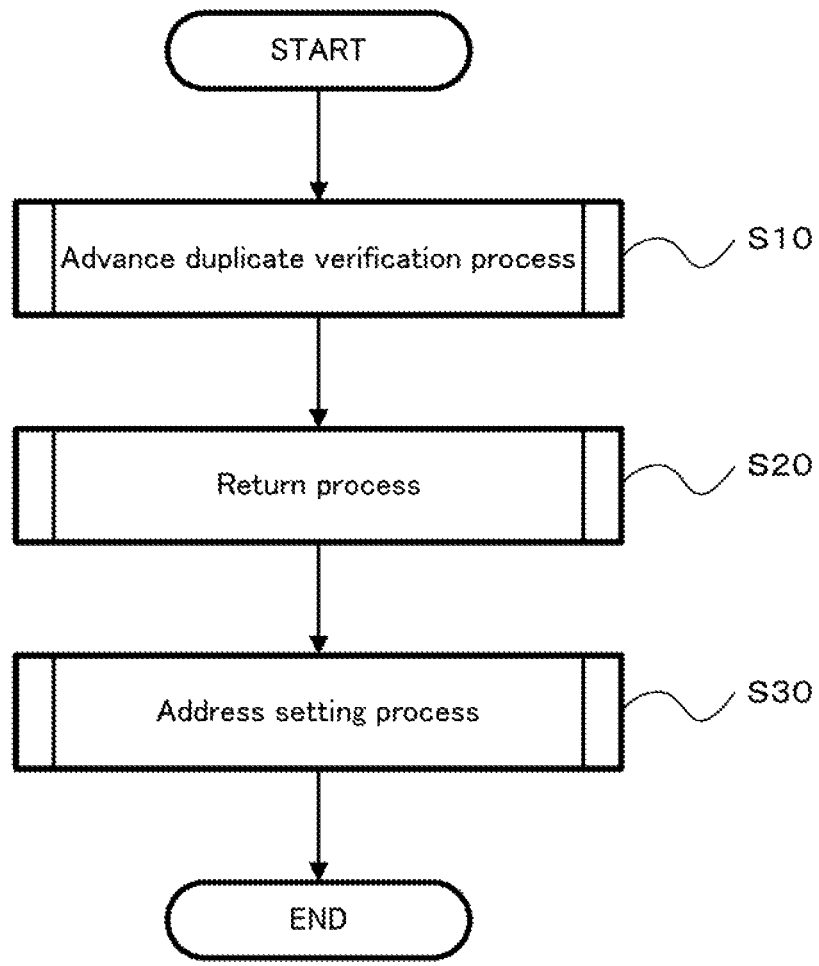
FIG. 10 is a flow chart showing the operation of the communication apparatus of the first exemplary embodiment.

FIG. 10 is a flow chart showing the communication processes executed by node 11 of the present exemplary embodiment. These communication processes are executed upon activation of node 11 or upon activation of a predetermined application.

Referring to FIG. 10, advance duplicate verification processor 111 first executes an advance duplicate verification process (Step S10). Address setting unit 115 executes a return process (S20), and executes an address setting process (Step S 30). After Step S30, node 11 ends the communication process.

The advance duplicate verification process is next described with reference to FIG. 11. The advance duplicate verification process is a process in which advance duplicate verification processor 111 verifies whether an address that duplicates a tentative address exists on network N1 before a valid address is set.

Figure 11:
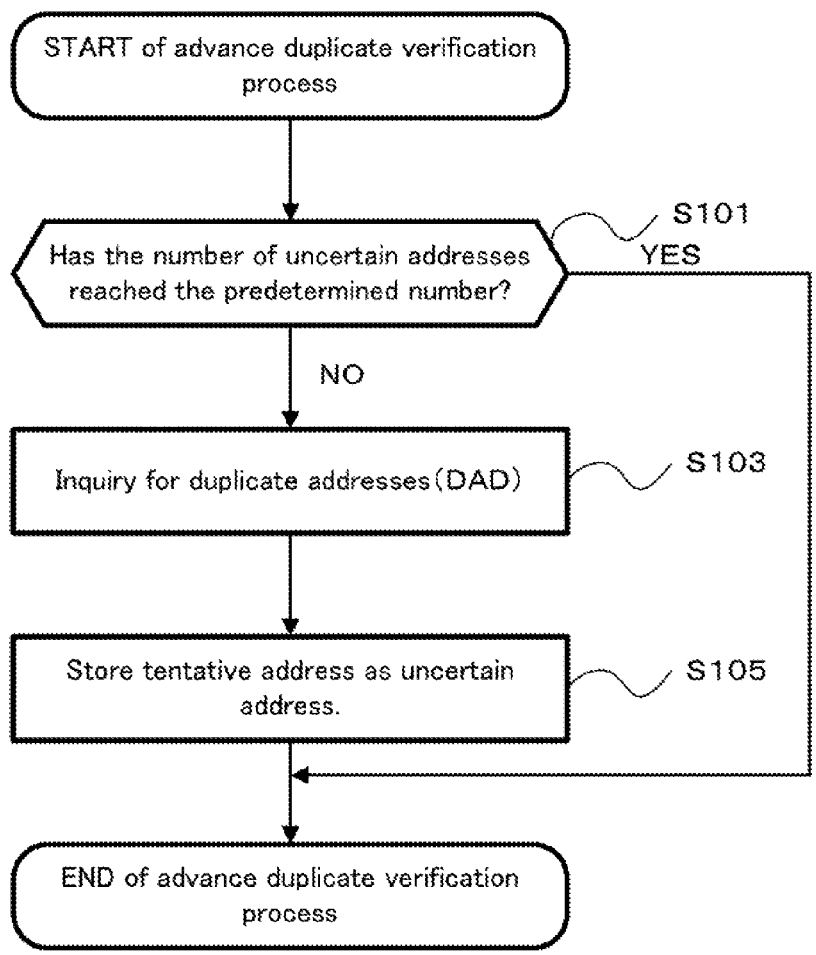
FIG. 11 is a flow chart showing the advance duplicate verification process of the first exemplary embodiment.

Referring to FIG. 11, advance duplicate verification processor 111 verifies whether the number of uncertain addresses that have been stored in memory unit 113 has reached a predetermined number (Step S101). The number of uncertain addresses that are stored can be any number. For example, in the present exemplary embodiment, at least four uncertain addresses are pooled as an address for setting as a valid address in its own node (11) and as addresses for transmitting to the other nodes 12-14.

If the number of uncertain addresses has not reached the predetermined number (Step S101: NO), advance duplicate verification processor 111 generates a tentative address and verifies whether a valid address that duplicates the generated tentative address exists on network N1 (Step S103). For example, advance duplicate verification processor 111 takes any invalid address as a tentative address and transmits to each node (12-16) an NS message inquiring whether a valid address that duplicates this tentative address exists on network N1.

If an NA message indicating that a duplicate address exists is not received within a predetermined time interval, advance duplicate verification processor 111 causes the address state of the tentative address to transition from "Tentative" to "Uncertain" and stores the tentative address as an uncertain address in memory unit 113 (Step S105).

If an NA message is received, or if an NS message is received that inquires about the same tentative address as the tentative address that was generated by that node, advance duplicate verification processor 111 causes the address state of the tentative address to transition from "Tentative" to "Invalid" and discards the tentative address.

After Step S105, or when the number of uncertain addresses reaches the predetermined number (Step S101 : YES), advance duplicate verification processor 111 terminates the communication process.

Advance duplicate verification processor 111 thus executes DAD processes in advance and stores tentative addresses for which uniqueness has been verified as uncertain addresses in memory unit 113.

The return process is next described with reference to FIG. 12. The return process is a process by which address setting unit 115, in response to an NS message inquiring about an address, returns an NA message under predetermined conditions.

Figure 12:
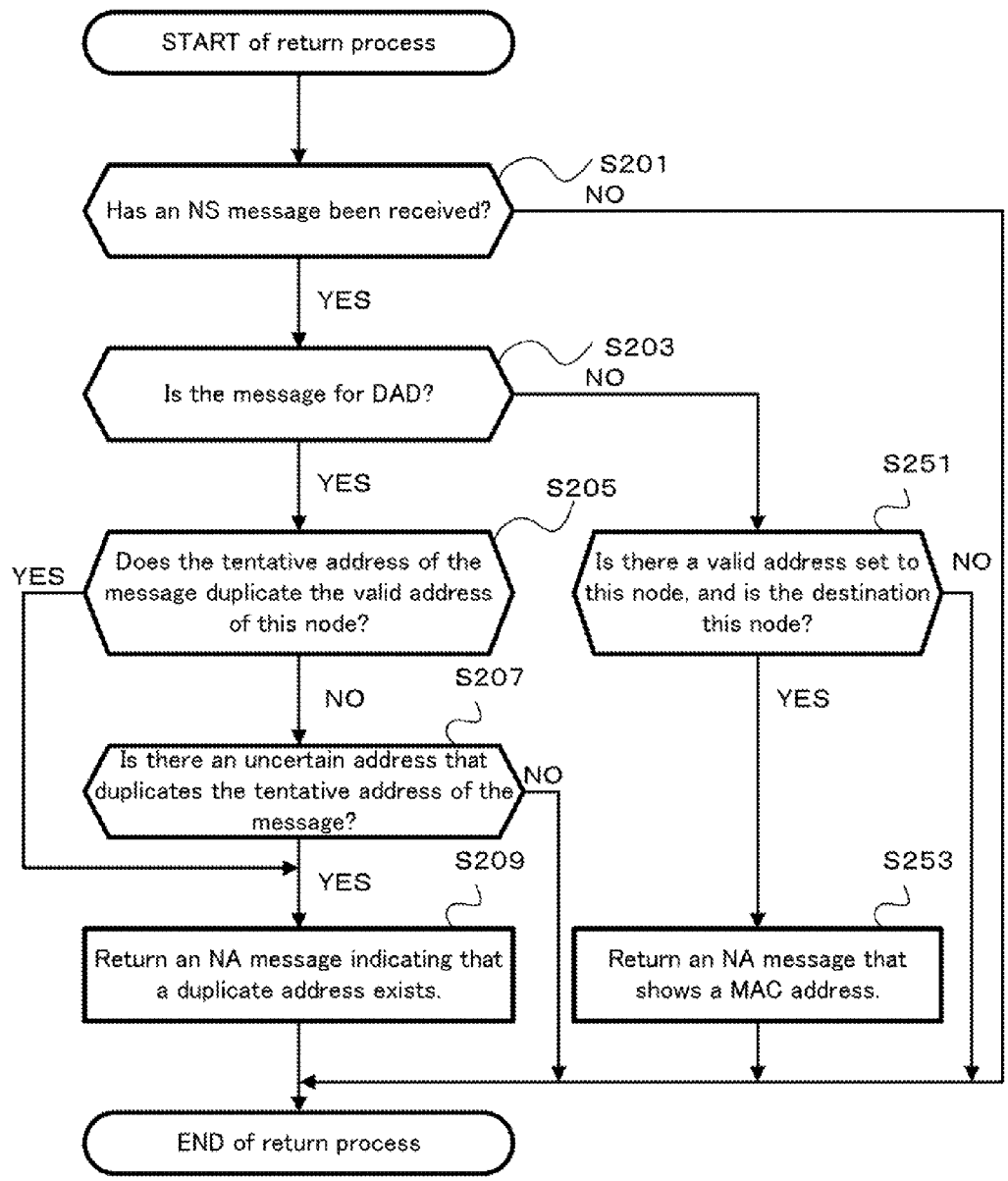
FIG. 12 is a flow chart showing the return process of the first exemplary embodiment.

Referring to FIG. 12, address setting unit 115 determines whether an NS message has been received or not (Step S201). If an NS message has been received (Step S201: YES), address setting unit 115 determines whether the received NS message is a message for DAD (Step S203). For example, when the address of the transmission origin of the NS message is an Unspecified Address (::), address setting unit 115 determines that the message is for DAD.

When the NS message is a message for DAD (Step S203: YES), and if a valid address is already set to its own node, address setting unit 115 determines whether the tentative address relating to the NS message matches the valid address set to its own node 11 (Step S205). If the tentative address does not match the valid address that has been set to node 11 itself, or if a valid address has not been set to node 11 (Step S205: NO), address setting unit 115 reads uncertain addresses from memory unit 113 and determines whether an uncertain address exists that duplicates the tentative address relating to the NS message (Step S207). If an uncertain address that duplicates the tentative address exists (Step S207: YES) or if the tentative address matches the valid address of its own node (Step S205: YES), address setting unit 115 transmits by broadcast an NA message indicating that a valid address exists that duplicates the tentative address (Step S209).

When the NS message is not a message for DAD (Step S203: NO), the received NS message is considered to be a message for L2 address resolution requesting transmission of a MAC address for communicating with node 11. In this case, address setting unit 115 determines whether a valid address has already been set to its own node (11), and moreover, whether the destination of the message is its own node or not (Step S251). If a valid address has already been set to its own node (11), and moreover, if the destination of the message is its own node (Step S251: YES), address setting unit 115 transmits to the transmission origin of the NS message an NA message indicating the MAC address of node 11 (Step S253). The node that has received the NA message updates neighbor cache 1212 based on the MAC address shown by the received message to carry out L2 address resolution.

Address setting unit 115 terminates the return process when a valid address has not been set to its own node (11) or when the destination of the message is not its own node (Step S251: NO), or alternatively, when an NS message has not been received (Step S201: NO), when there is no reserved address that duplicates a tentative address (Step S207: NO), or after Step S209 or Step S253.

In this way, address setting unit 115 returns an NA message indicating that a duplicate address exists upon receipt of an NS message for a DAD process and when a tentative address duplicates an uncertain address or its own valid address. As a result, an uncertain address that duplicates a valid address is not set to another node, and nodes of the present exemplary embodiment have absolutely no influence upon the communication of other nodes.

When an NS message is received for L2 address resolution, and moreover, a valid address is set to its own node, address setting unit 115 returns an NA message indicating a MAC address. As a result, communication with a destination to which a valid address has not been set is not started, and absolutely no problems arise in communication between nodes of the present exemplary embodiment.

The address setting process is next described with reference to FIG. 13. The address setting process is a process in which address setting unit 115 sets an uncertain address to its own node as a valid address or transmits a message indicating an uncertain address to another node.

Figure 13:
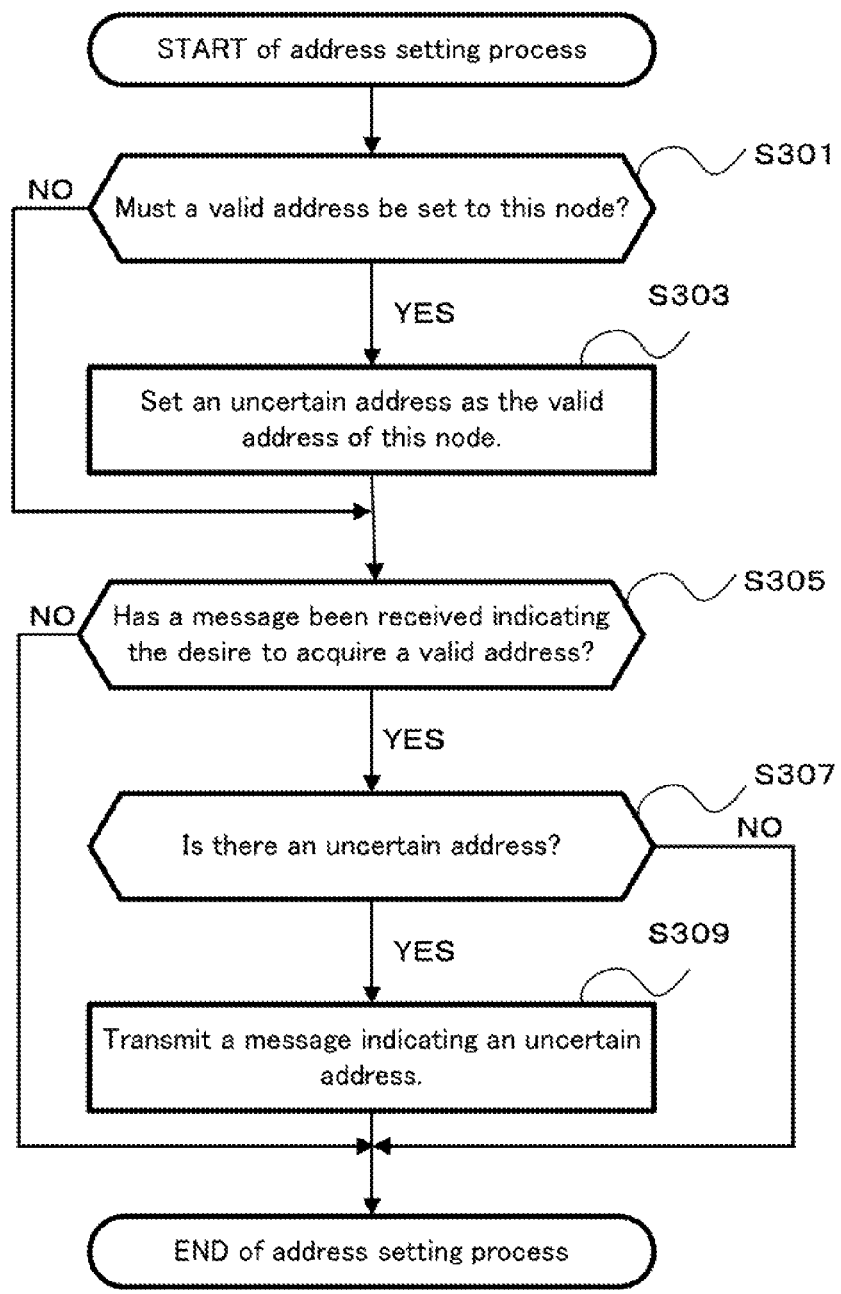
FIG. 13 is a flow chart showing the address setting process of the first exemplary embodiment.

Referring to FIG. 13, address setting unit 115 first determines whether or not a valid address must be set to its own node (Step S301). For example, a valid address is necessary when node 11 designates the transmission origin address to start communication with other nodes 12-14 that are connected to network N1.

When a valid address must be set (S301: YES), address setting unit 115 causes the address state of an uncertain address that was read from memory unit 113 to transition from "Uncertain" to "Valid" and sets the uncertain address as the valid address of its own node (Step S303).

When a valid address need not be set (S301: NO), or after Step S303, address setting unit 115 determines whether or not a message indicating a request to acquire an IP address has been received from another node (Step S305).

If a message indicating a desire to acquire an IP address has been received (Step S305: YES), address setting unit 115 determines whether an uncertain address is stored in memory unit 113 (Step S307).

If an uncertain address is stored in memory unit 113 (Step S307: YES), address setting unit 115 transmits a message indicating an uncertain address and causes the address state of the uncertain address that was transmitted to transition from "Uncertain" to "Invalid" (Step S309).

Address setting unit 115 terminates the address setting process when an uncertain address is not stored in memory unit 113 (Step S307: NO) or when a message indicating a desire to acquire an IP address has not been received (Step S305: NO), or alternatively, after Step S309.

In this way, when there is an uncertain address, address setting unit 115 sets the uncertain address to its own node without carrying out a DAD process and transmits a message indicating the uncertain address to other nodes according to requests.

Figure 14:
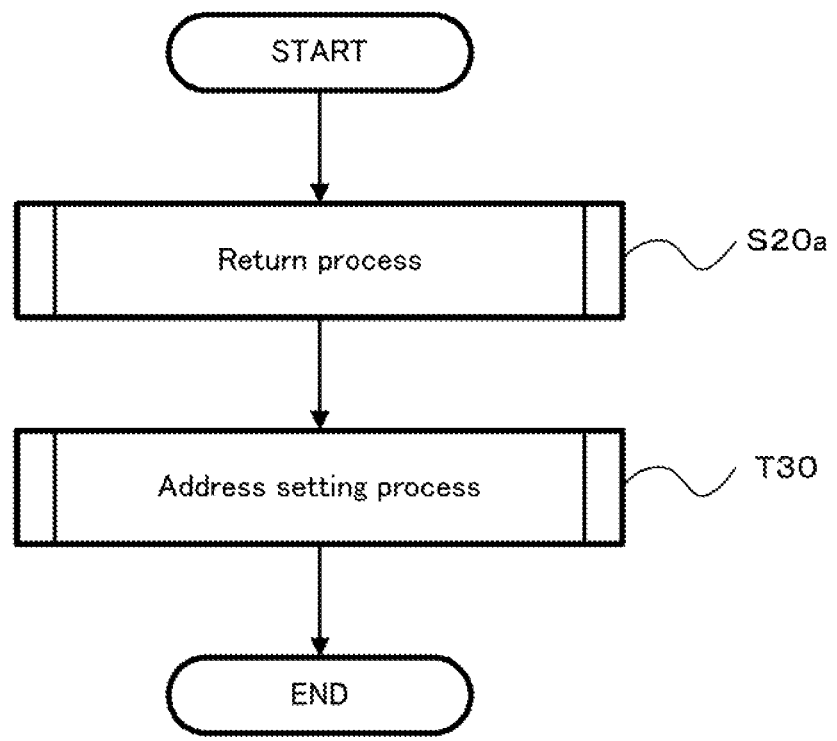
FIG. 14 is a flow chart showing the operation of the communication apparatus of the first exemplary embodiment.

The operations of nodes 12-14 are next described with reference to FIGS. 14-16. FIG. 14 is a flow chart showing the communication process that is executed by node 12. This communication process is started upon activation of node 12 or upon activation of a predetermined application.

Referring to FIG. 14, address setting unit 123 executes the return process (Step S20a) and executes the address setting process (Step T30). After Step T30, address setting unit 123 terminates the communication process.

Figure 15:
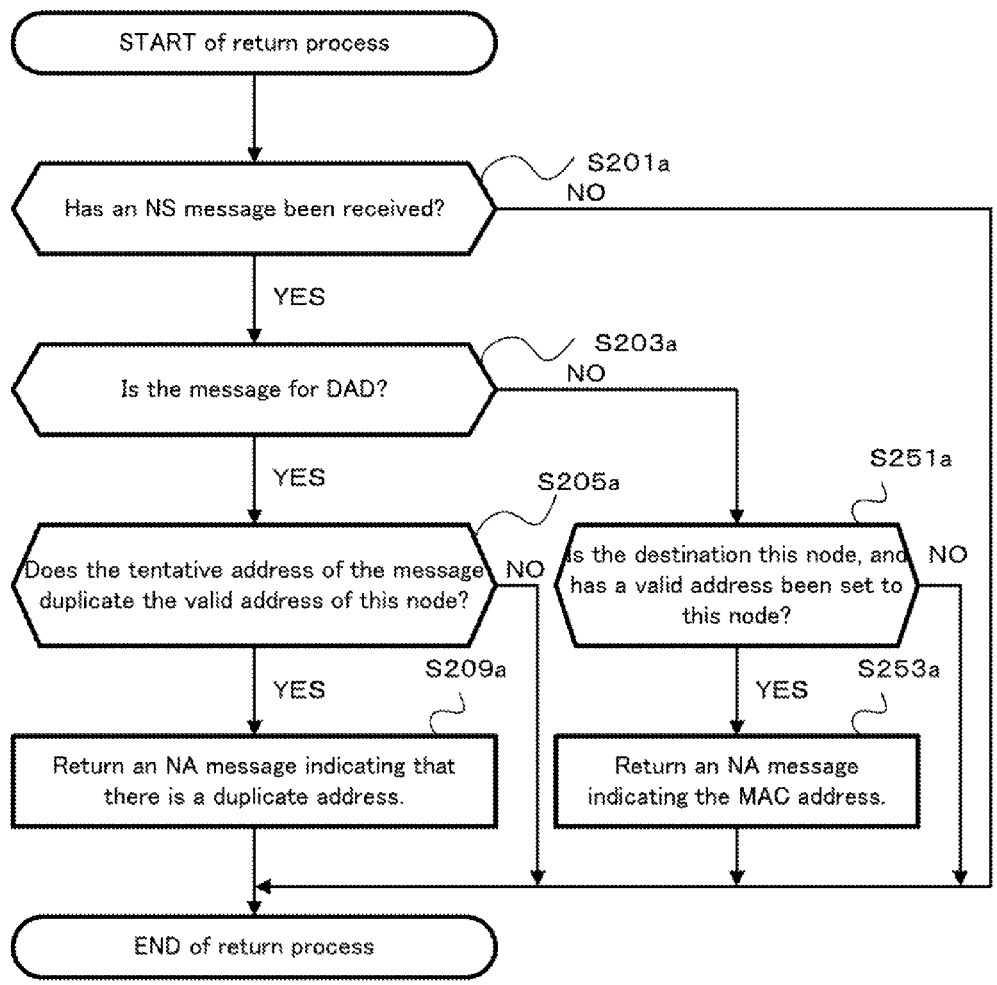
FIG. 15 is a flow chart showing the return process of the first exemplary embodiment.

Referring to FIG. 15, the return process that is executed by address setting unit 123 is next described. FIG. 15 is a flow chart showing the return process that is executed by address setting unit 123. Step S201a-Step S205a, Step S209a, and Steps S251a-S253a in the figure are identical to Steps S201-S205, Step S209, and Steps S251-S253 in FIG. 12.

The return process shown in FIG. 15 is the same as the return process executed by node 11 with the exception that the return process is terminated without carrying out Step S207 shown in FIG. 12 when the tentative address of an NS message does not match the valid address of its own node (Step S205a: NO).

Because node 12 therefore does not store an uncertain address, the determination of the existence of an uncertain address that duplicates the tentative address of the NS message (Step S207) is not carried out in the return process shown in FIG. 15.

The address setting process that is executed by address setting unit 123 is next described with reference to FIG. 16. This address setting process is a process in which node 12 receives a message indicating an uncertain address and sets the uncertain address relating to the message as the valid address.

Figure 16:
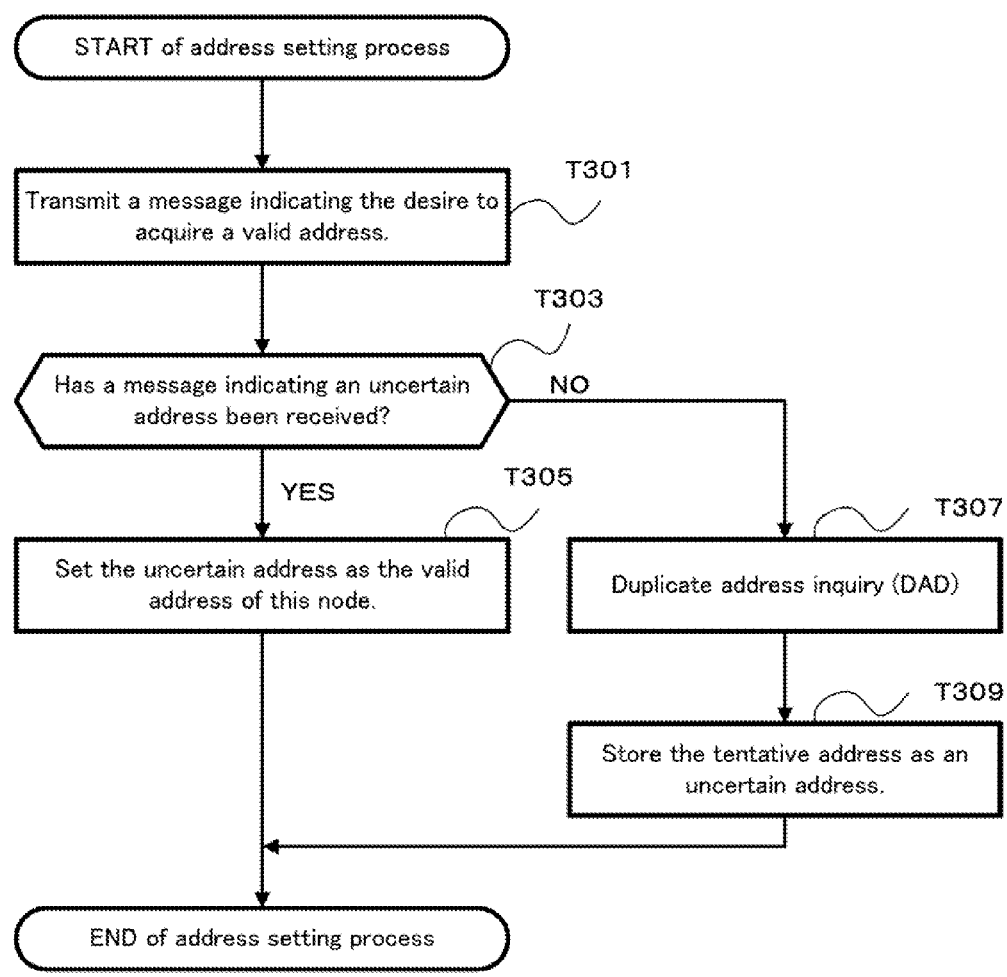
FIG. 16 is a flow chart showing the address setting process of the first exemplary embodiment.

FIG. 16 is a flow chart showing the address setting process. Referring to FIG. 16, address setting unit 123 transmits by broadcast a message indicating the desire to acquire an IP address (Step T301).

As shown in FIG. 13, if node 11 receives the message indicating a desire to acquire an IP address (Step S305: YES) and if there is an uncertain address (Step S307: YES), node 11 transmits by broadcast a message indicating the uncertain address (Step S309).

Returning to FIG. 16, after Step T301, address setting unit 123 determines whether or not a message indicating an uncertain address has been received (Step T303). When a message indicating an uncertain address has been received (Step T303: YES), uncertain address reception unit 123 sets the uncertain address indicated by the message as the valid address of its own node (Step T305).

If a message indicating an uncertain address is not received within a predetermined time interval (Step T303: NO), address setting unit 123 generates a tentative address and transmits an NS message checking for the existence of a valid address that duplicates the tentative address (Step T307). If an NA message is not received within a predetermined time interval, address setting unit 123 sets the tentative address as a valid address (Step T309).

After Step T305 or Step T309, address setting unit 123 terminates the address setting process.

The operations of node 13 and node 14 are the same as node 12.

In this way, nodes 12-14 are able to set valid addresses without carrying out the DAD process if they are able to receive uncertain addresses from node 11.

An example of the operation results of communication system 1 are next described with reference to FIGS. 17-20.

Figure 17:
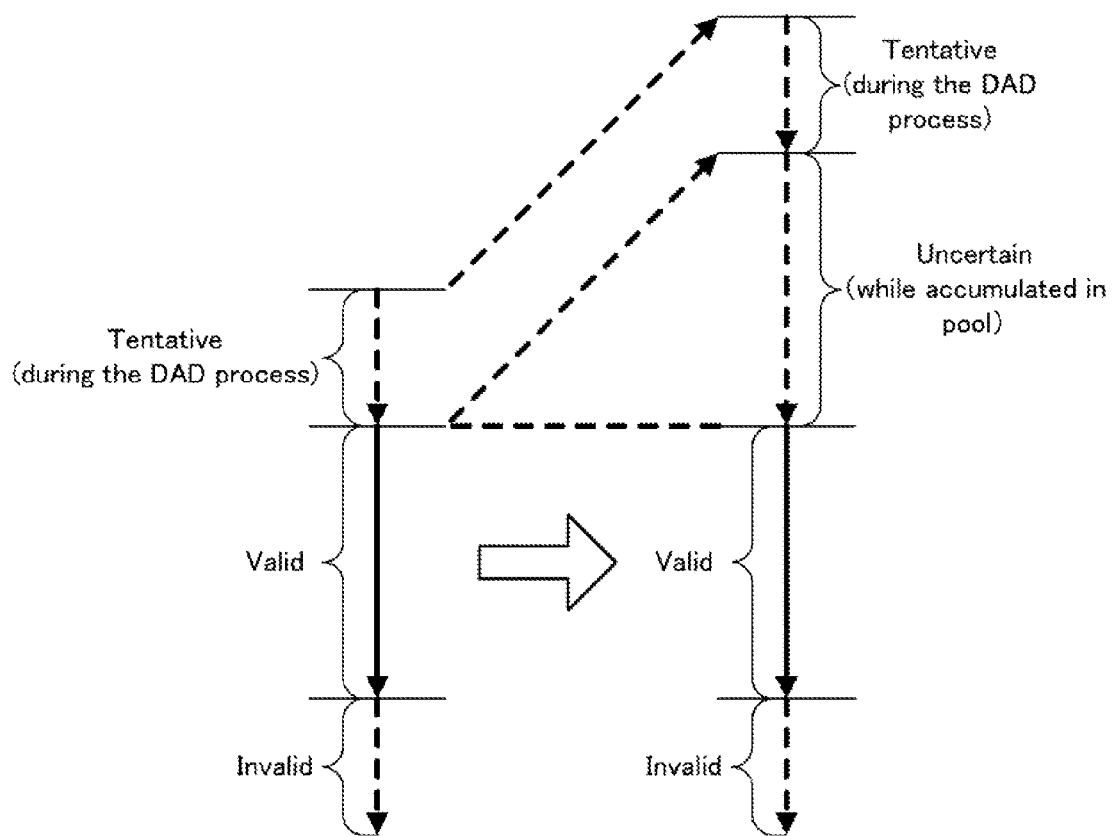
FIG. 17 shows in time-series order the transition of address states of IP addresses in the first exemplary embodiment.
Figure 18:
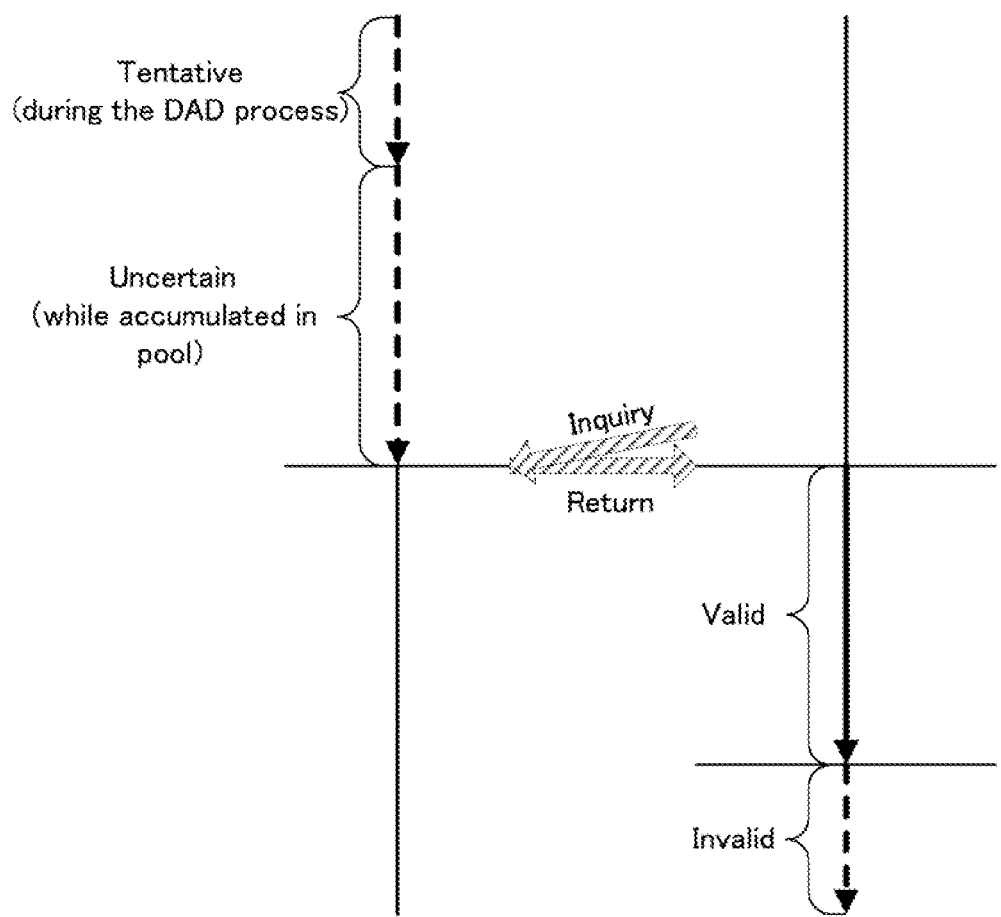
FIG. 18 shows in time-series order the transition of address states of IP addresses in the first exemplary embodiment.

FIG. 17 shows in time-series order the transition of the address state of an address stored in node 11, and FIG. 18 shows in time-series order the transition of the address states of addresses stored in nodes 11-14.

Referring to FIG. 17, a case is described in which node 11 that has generated an uncertain address sets to itself the generated uncertain address as the valid address.

The portion of FIG. 17 to the left of the blank arrow shows in time-series order the transition of the address state of an IP address in a node of the prior art, and the portion to the right of the arrow shows in time-series order the transition of the address state of an IP address in node 11 of the present exemplary embodiment. Referring to the figure, in the node of the prior art (to the left of the arrow), the address state is "Tentative" during the DAD process and transitions to "Valid" if the DAD process succeeds.

In contrast, in node 11 of the present exemplary embodiment (to the right of the arrow), instead of transitioning to "Valid" when the DAD process succeeds, the address state transitions from "Tentative" to "Uncertain" (Step S105).

Then, if node 11 itself requires a valid address (S301: YES), node 11 sets one uncertain address as its own valid address. In this case, the address state of the uncertain address transitions from "Uncertain" to "Valid."

In other words, node 11 is able to finish the DAD process before the "Valid" state is attained and, upon transitioning to the "Valid" state that actually uses an address, is able to immediately cause the transition of the address state without carrying out the DAD process. As a result, the time interval until an address is set is reduced.

A case is next described with reference to FIG. 18 in which an uncertain address is transferred from node 11 to another node as a valid address.

Referring to FIG. 18, a valid address is not initially set to node 12. Node 12 transmits a message indicating the desire to acquire an IP address (Step T301). If an uncertain address in the "Uncertain" state is stored (Step S307: YES), node 11 then transmits a message indicating the uncertain address (valid address) (Step S309).

Node 12 sets the uncertain address (valid address) shown in the received message as the valid address of its own node (Step T305). In this case, the address state of the address that was received is "Valid" as shown in FIG. 18. The arrows with diagonal line hatching in FIG. 18 signify the transmission of messages indicating the desire to acquire the transmission of a valid address and messages indicating an uncertain address (valid address).

The address state of an address thus transitions from "Invalid" to "Tentative" when a DAD process is started, transitions to "Uncertain" if the DAD process succeeds, and transitions to "Valid" when set as a valid address.

Figure 19:
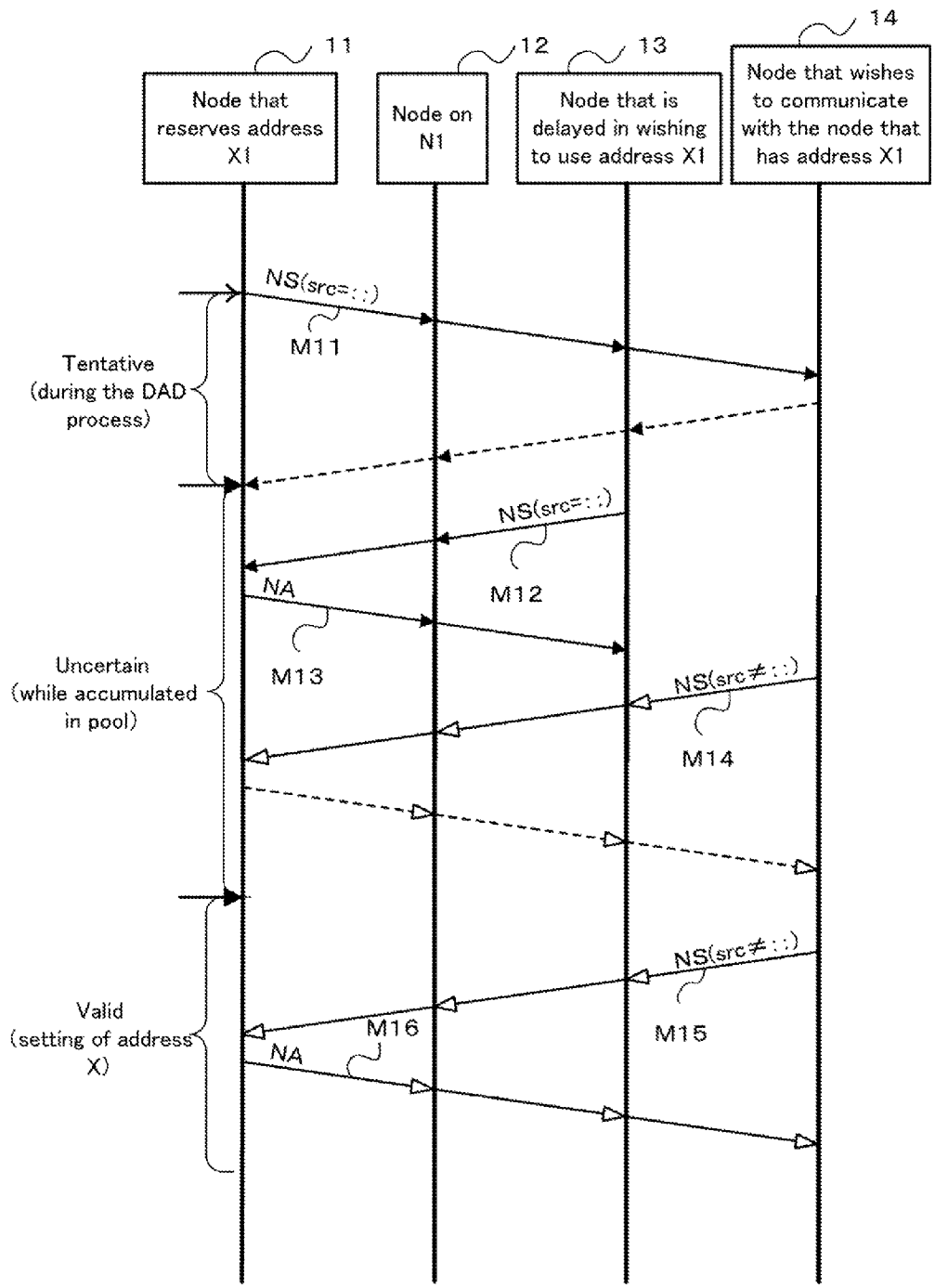
FIG. 19 is a sequence chart showing in time-series order an example of the flow of messages in the communication system of the first exemplary embodiment.
Figure 20:
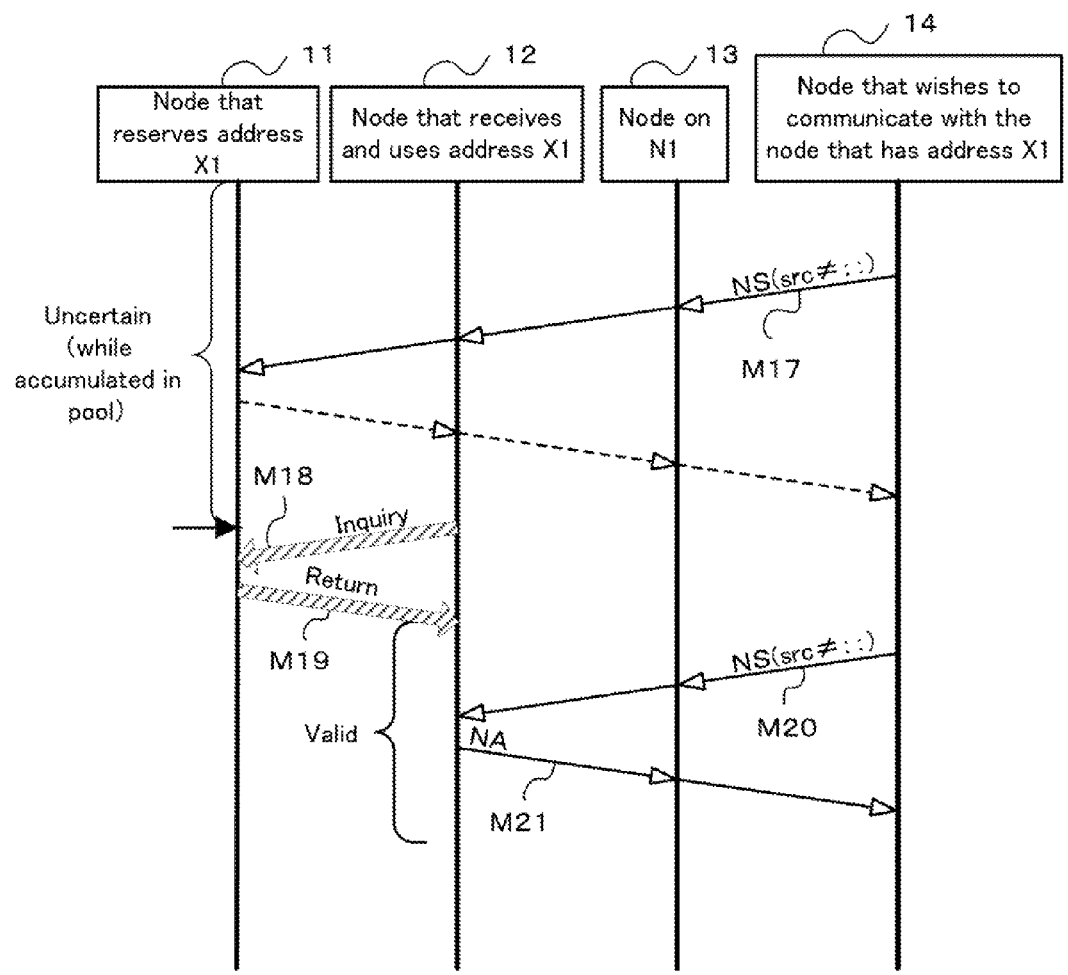
FIG. 20 is a sequence chart showing in time-series order an example of the flow of messages in the communication system of the first exemplary embodiment.

FIGS. 19 and 20 are sequence charts showing in time-series order the flow of messages between nodes in communication system 1.

In FIG. 19, node 11 reserves IP address "X1" as an uncertain address. After a delay, node 13 attempts to set IP address "X1" as a valid address. Node 14 attempts to communicate with the node that has IP address "X1." Node 12 does not attempt to set IP address "X1" and does not carry out communication with the node that has the IP address "X1."

In FIGS. 19 and 20, the normal arrows between nodes indicate transmission of NS messages for DAD processes, and the blank arrows indicate the transmission of NS messages for L2 address resolution. Arrows with diagonal-line hatching indicate the transmission of messages indicating the desire to acquire the transmission of a valid address and the transmission of messages indicating an uncertain address (valid address). "NS(src=::)" in FIGS. 19 and 20 indicates an NS message for DAD, and "NS(src≠::)" indicates an NS message for L2 address resolution.

Referring to FIG. 19, node 11 does not at first store IP address "X1" as an uncertain address. When node 11 attempts to reserve IP address "X1," node 11 transmits by broadcast NS message M11 inquiring about the existence of a valid address that duplicates this address as a tentative address (Step S103). Because IP address "X1" is not set to another node at this time, an NA message indicating the existence of a duplicate address is not transmitted from any node (Step S205a: NO). The dotted lines in FIG. 19 indicate that an NA message is not transmitted from each node in response to the NS message.

Due to the success of the DAD process, node 11 stores tentative address "X1" as an uncertain address (Step S105). A case is considered in which, when node 13 subsequently attempts at a delayed time to acquire IP address "X1," NS message M12 that takes IP address "X1" as a tentative address is transmitted (Step T301). At this time, the uncertain address saved by node 11 matches the tentative address (Step S207: YES), whereby node 11 returns NA message M13 indicating duplication (Step S209). Node 13 receives NA message M13 and discards the tentative address.

In this way, when the address state is "Uncertain," a valid address is not set that duplicates this uncertain address.

A case is next considered in which, node 14 transmits NS message M14 to attempt communication with the node to which IP address "X1" has been set when IP address "X1" is not set to node 11. At this time, a valid address is not set to node 11 (Step S251: NO), and node 11 therefore does not return an NA message. The dotted lines in FIG. 19 indicate that NA messages responding to the NS message are not transmitted from each node.

A case is considered in which, node 14 again transmits NS message M15 indicating IP address "X1" when node 11 has set uncertain address "X1" as a valid address to its own node to start communication (Step S303). At this time, the address indicated by message M15 matches with the valid address of its own node (Step S251: YES) and node 11 therefore returns NA message M16 indicating the MAC address of its own node to node 14 (Step S253).

Thus, when an uncertain address has not been set as a valid address, node 11 does not return an NA message even when node 11 receives an NS message for L2 address resolution that indicates the same address as the uncertain address. As a result, a neighbor cache is not updated based on the NA message, and there is absolutely no confusion of communication.

A case is next considered with reference to FIG. 20 in which an NA message indicating an uncertain address is transmitted from node 11 to node 12.

In FIG. 20, node 11 reserves IP address "X1" as an uncertain address. Node 12 acquires IP address "X1" and attempts to set the IP address. Node 14 attempts communication with the node that has IP address "X1." Node 13 does not attempt to set IP address "X1" and does not carry out communication with the node that has IP address "X1."

Despite the transmission by node 14 of NS message M17 that attempts communication with the node of IP address "X1" while node 11 is reserving IP address "X1" as an uncertain address, IP address "X1" is not set to node 11 (Step S251: NO) and node 11 therefore does not return an NA message. The dotted lines in FIG. 20 indicate that NA messages are not transmitted from each node in response to the NS message.

However, when node 12 transmits message M18 requesting the acquisition of an IP address (Step T301), node 11 transmits message M19 indicating IP address "X1" in response to this message 18 (Step S309). Node 12 sets the IP address "X1" shown in M19 to its own node (Step T305).

M18 is, for example, a DHCPDISCOVER message in DHCP protocol, and M19 is a DHCPOFFER message.

When node 14 then again transmits NS message M20 attempting communication with the node of IP address "X1," IP address "X1" is set to node 12 (Step S251a: YES), and node 12 therefore returns NA message M21 indicating the MAC address of its own node (Step S253a).

A node that has received a message indicating an uncertain address is thus able to set this uncertain address as a valid address and begin communication that designates the address at which the transmission originates with other nodes.

Figure 21:
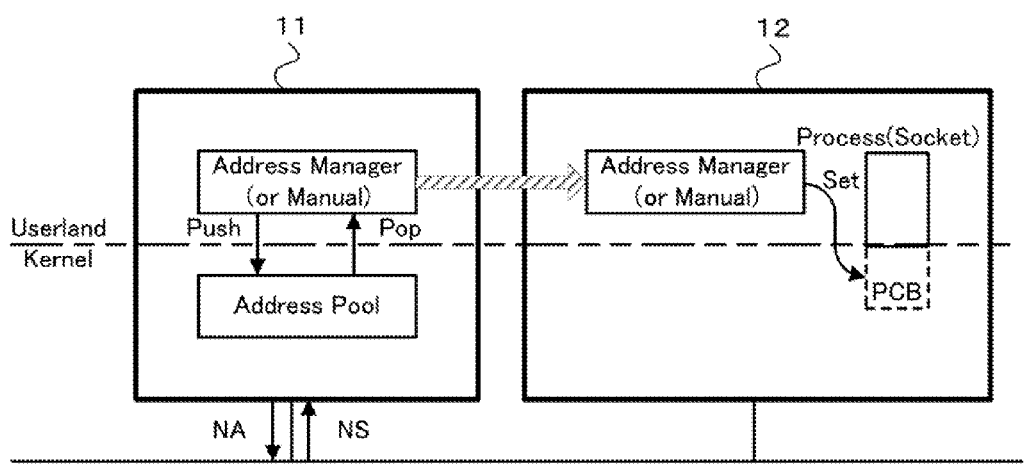
FIG. 21 shows the configuration of the communication system of the first exemplary embodiment.

The address management method in communication system 1 of the present exemplary embodiment is next summarized with reference to FIG. 21. In FIG. 21, the uncertain addresses (address pool) that are pooled in node 11 are used as information for responding to an ND (Neighbor Discovery) message, and are therefore typically prepared in the kernel space of a node similar to a neighbor cache. Processing of the addresses is termed and organized as shown below.

Push: Accumulate addresses in a pool
Pop: Extract an address from the pool
Set: Set an address to a process (socket)

Address information is finally set to a corresponding PCB (Process Control Block). A DAS (Delayed Address Setting) process is a process in which this process is carried out after process activation. The most basic method of accumulating addresses in an address pool is a manual Push process. Because the addresses that are accumulated in an address pool are naturally consumed and reduced in number by the Pop process that accompanies use of the service, new addresses must be continuously supplied, meaning that there is a limit to how long a user will continue to carry out the process manually. An Address Manager Daemon is therefore naturally used to carry out the work of replenishing new addresses while checking the quantity of addresses that have accumulated in the pool.

When the DAS process is carried out, the SET process is executed internally. This process is basically considered to be carried out via a Pop process through an Address Manager Daemon. Essentially, however, an address is directly set to a PCB in a kernel that corresponds to the process of a user land from an address pool in a kernel as a process that is closed within a kernel.

As shown in FIG. 17, the address makes a closed transition (self-terminating) in one node (11). On the other hand, addresses of the Uncertain state do not revert to any node, and as shown in FIG. 18, other nodes take over addresses that have accumulated in the pool, and nodes that have taken over addresses can cause address transitions that follow (external pool use). In this way, a dedicated pool server (11) is realized.

Figure 22:
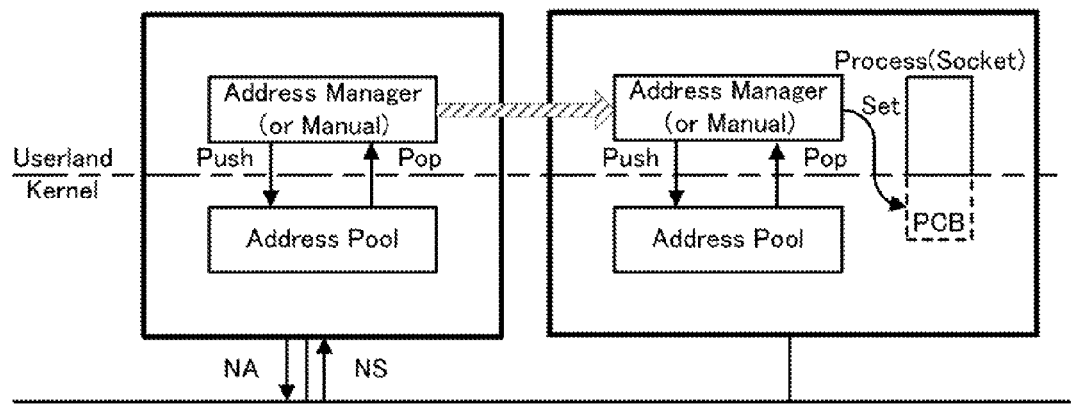
FIG. 22 shows the configuration of a modification of the communication system.

Although only one node (11) stores uncertain address in the present exemplary embodiment, a communication system in which two or more nodes store uncertain addresses is also possible. When a plurality of nodes pool uncertain addresses, a node can fix the address state of an address that it has taken over at "Uncertain" without changing the address state. Accordingly, a multistage pool server can also be realized as shown in FIG. 22. A client having its own pool such as node 11 can also serve as a multistage pool server. However, a client that lacks its own pool such as nodes 12-14 cannot become a multi-stage pool server, and when such a client takes over an address, it sets the address to itself and uses the address (Step T305).

The communication apparatus of the present exemplary embodiment can also be applied to an apparatus that carries out the handover process of a Mobile IP. In the handover process of a Mobile IP, an address referred to as a CoA (Care of Address) must be acquired dynamically at the network destination of movement, but due to the adoption of the communication apparatus of the present exemplary embodiment, a communication apparatus can omit the DAD process when acquiring the CoA at the movement destination, whereby a high-speed handover can be realized.

Alternatively, there are communication systems in which, in each session that a client holds, the client dynamically creates and uses its own address that is used in the session, and communication systems in which, each time a server begins a session in accordance with a connection request from a client, an address is used that is dynamically created in the session. The DAD process is also required in these communication systems, but by applying the communication apparatus of the present exemplary embodiment, the communication apparatus is able to set an address and begin a session at higher speed.

Second Exemplary Embodiment

The second exemplary embodiment of the present invention is next described. The communication apparatus of the present invention can be used together with a communication apparatus of the prior art. The communication system according to the present exemplary embodiment is a system that combines a communication apparatus of the present invention with communication apparatuses of the prior art.

The configuration of the communication system of the present exemplary embodiment is similar to that of the first exemplary embodiment with the exception that nodes 12-14 are communication apparatuses of the prior art.

The operation of typical nodes 12-14 is similar to that of nodes 12-14 according to the first exemplary embodiment with the exception of the address setting process.

The address setting process of typical nodes 12-14 is next described with reference to FIG. 23.

Figure 23:
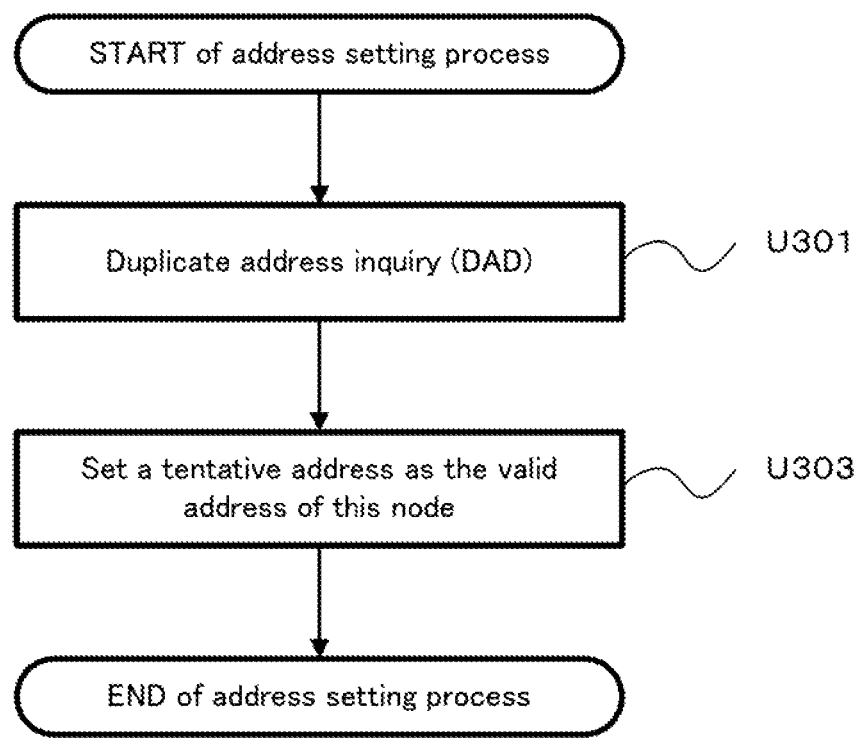
FIG. 23 is a flow chart showing the address setting process of the second exemplary embodiment.

FIG. 23 is a flow chart showing the address setting process that is executed by nodes 12-14 according to the present exemplary embodiment. Referring to the figure, valid address setting unit 123 carries out a DAD process (Step U301), and if successful, sets the tentative address as a valid address (Step U303).

In this way, typical nodes 12-14 carry out a DAD process after valid addresses have become necessary and set tentative addresses as valid addresses after success in the DAD process.

Use of these typical nodes 12-14 within the same network and at the same time as node 11 of the present exemplary embodiment presents no problems. When nodes 12-14 issue inquiries regarding tentative addresses that duplicate uncertain addresses (Step U301), node 11 transmits an NA message (Step S209). As a result, when nodes 12-14 determine that a valid address exists that duplicates a tentative address, they discard the tentative address that was created. Accordingly, valid addresses that duplicate uncertain addresses are not set to nodes 12-14, and node 11 of the present exemplary embodiment and typical nodes 12-14 can be used in the same network with absolutely no problems.

According to the present exemplary embodiment, a node (11) of the present exemplary embodiment can be mixed with typical nodes (12-14), whereby the address setting time can be shortened for a desired node (11) while maintaining the configurations (12-14) of an existing system.

Third Exemplary Embodiment

The third exemplary embodiment of the present invention is next described.

In the first exemplary embodiment, when any of nodes 12-14 of the present exemplary embodiment receives an uncertain address, the time from the reception until setting of a valid address is sufficiently short, and there is consequently virtually no possibility of a valid address that duplicates an uncertain address being set to another node during this time interval. However, because this time interval is not absolutely zero, the possibility exists that when the setting of a valid address in a node that has received an uncertain address takes time, another node will succeed in the DAD process and a valid address that duplicates the uncertain address will be set. Setting of a duplicate address results in disordered communication and therefore must be prevented.

The communication system according to the present exemplary embodiment has a configuration for preventing the setting of a duplicate address during the time interval from the reception to the setting of an uncertain address.

The configuration of communication system 2 of the present exemplary embodiment is similar to that of the first exemplary embodiment.

Figure 24:
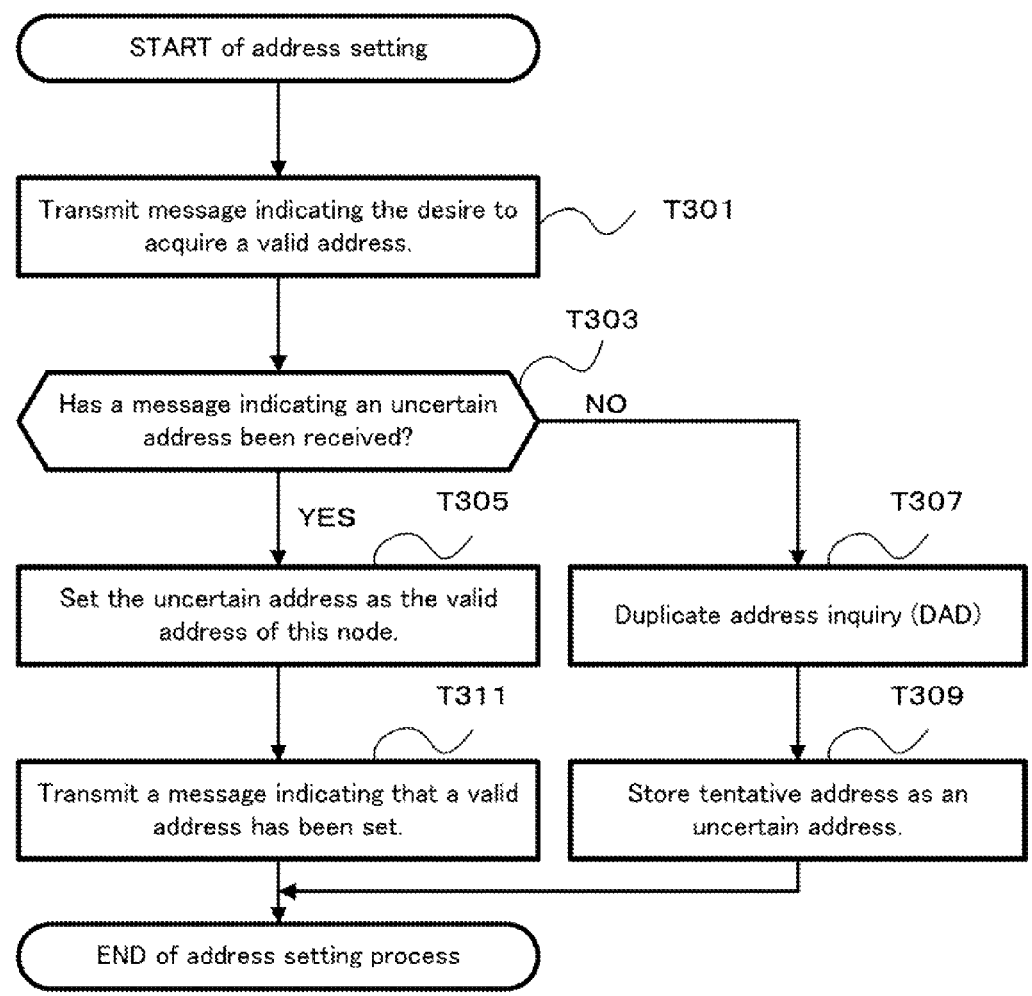
FIG. 24 is a flow chart showing the address setting process of the third exemplary embodiment.

Referring to FIG. 24, the operation of nodes 12-14 of the present exemplary embodiment is described. The operation of nodes 12-14 is similar to that of nodes 12-14 in the first exemplary embodiment with the exception of the execution of Step T311 after Step T305.

FIG. 24 is a flow chart showing the address setting process of node 12. Referring to the figure, after Step T305, address setting unit 123 transmits a message to node 11 indicating that a valid address has been set to its own node (Step T311).

The operation of node 11 of the present exemplary embodiment is described with reference to FIG. 25. The operation of node 11 is similar to that of node 11 in the first exemplary embodiment with the exception of the execution of Step S211 and Step S213 in the return process.

Figure 25:
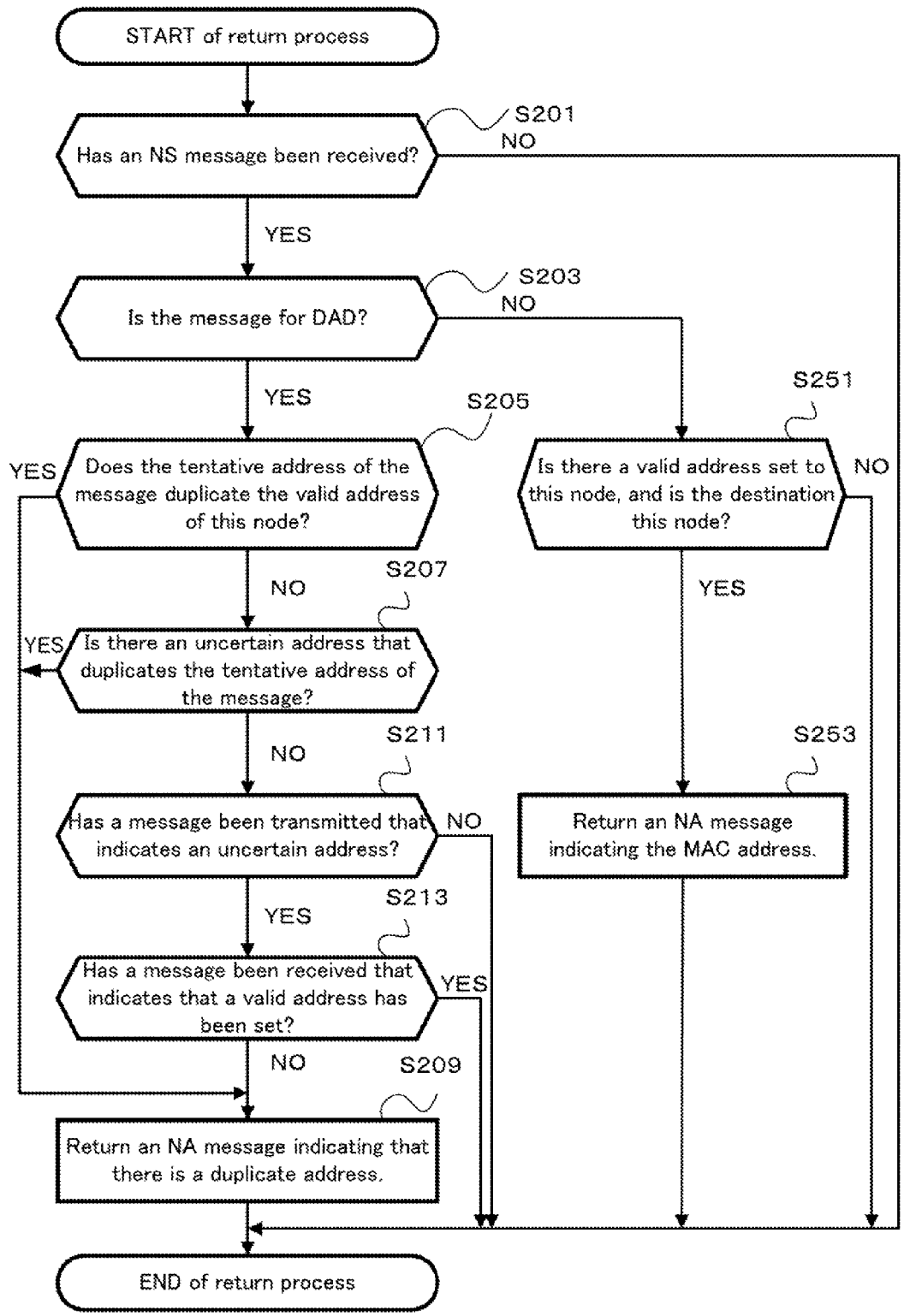
FIG. 25 is a flow chart showing the return process of the third exemplary embodiment.

FIG. 25 is a flow chart showing the return process of node 11. Referring to the figure, if there is no uncertain address that duplicates the tentative address shown in the NS message (Step S207: NO), address setting unit 115 determines whether a message that indicates the uncertain address has been transmitted to other nodes (Step S211). If a message indicating the uncertain address has been transmitted to another node (Step S211: YES), address setting unit 115 determines whether a message has been received indicating that a valid address has been set (Step S123). If a message indicating that a valid address has been set is not received (Step S213: NO), address setting unit 115 transmits an NA message indicating that a duplicate address exists (Step S209).

If a message indicating that a valid address has been set is received (Step S213: YES), or if a message indicating an uncertain address has not been transmitted to another node (Step S211: NO), address setting unit 115 terminates the return process.

According to the present exemplary embodiment, node 11 continues to transmit an NA message indicating the existence of a duplicate address (Step S209) from the transmission of a message indicating an uncertain address to node 12 (Step S211: YES) until receipt of a message indicating that a valid address has been set to node 12 (Step S213: YES).

As a result, a valid address that duplicates an uncertain address is not set to another node during the interval from receipt by node 12 of an uncertain address to setting as a valid address, and the reliability of the communication system is improved.

The time interval from receipt to the setting of an uncertain address can be estimated to a certain degree. As a result, node 11 can adopt a configuration that, without transmitting and receiving messages indicating that setting has occurred, continues to transmit an NA message during the estimated time interval following the transmission of mail indicating an uncertain address.

Fourth Exemplary Embodiment

The fourth exemplary embodiment of the present invention is next described. The communication apparatus of the present invention can also be used to automatically generate a state-full address. The present exemplary embodiment uses node 11 as a DHCP server.

The configuration of the communication system of the present exemplary embodiment is similar to communication system 1 according to the first exemplary embodiment with the exception that node 11 has the functions of a DHCP server and nodes 12-14 have the functions of DHCP clients.

In place of a DAD process in Step S10, the DHCP server (11) verifies that an IP address is not duplicated by means of a Gratuitous ARP transmission and pools IP addresses (uncertain addresses) corresponding to the number of clients. The DHCP clients (12-14) submit requests to the DHCP server to acquire IP addresses, and the DHCP server leases the pooled IP addresses for a fixed time interval according to the requests.

The operations of node 11 of the present exemplary embodiment are next described with reference to FIGS. 26 and 27.

The operations of node 11 of the present exemplary embodiment are similar to those of node 11 of the first exemplary embodiment with the exception that Steps S203-S209 are not executed in the return process and Step S311 is executed in place of Step S301 in the address setting process.

Figure 26:
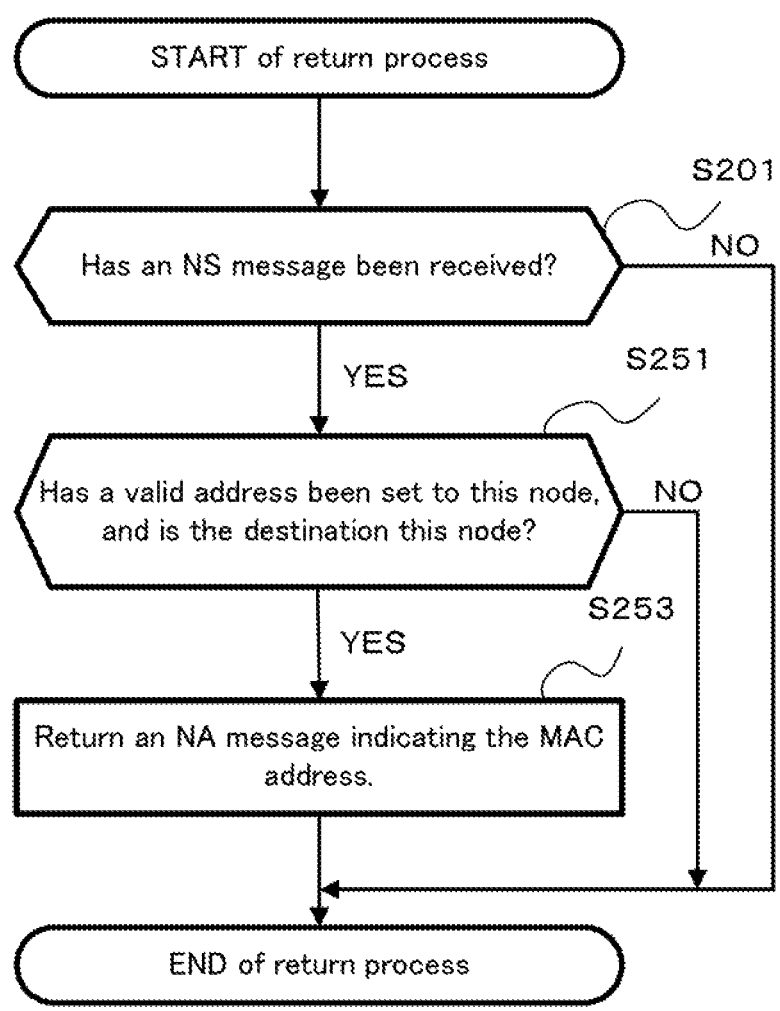
FIG. 26 is a flow chart showing the return process of the fourth exemplary embodiment.

FIG. 26 is a flow chart showing the return process executed by node 11 of the present exemplary embodiment. Referring to the figure, upon receiving an NS message (Step S201: YES), address setting unit 115 executes Step S251 without determining whether the NS message is a message for duplicate address verification (Step S203).

Figure 27:
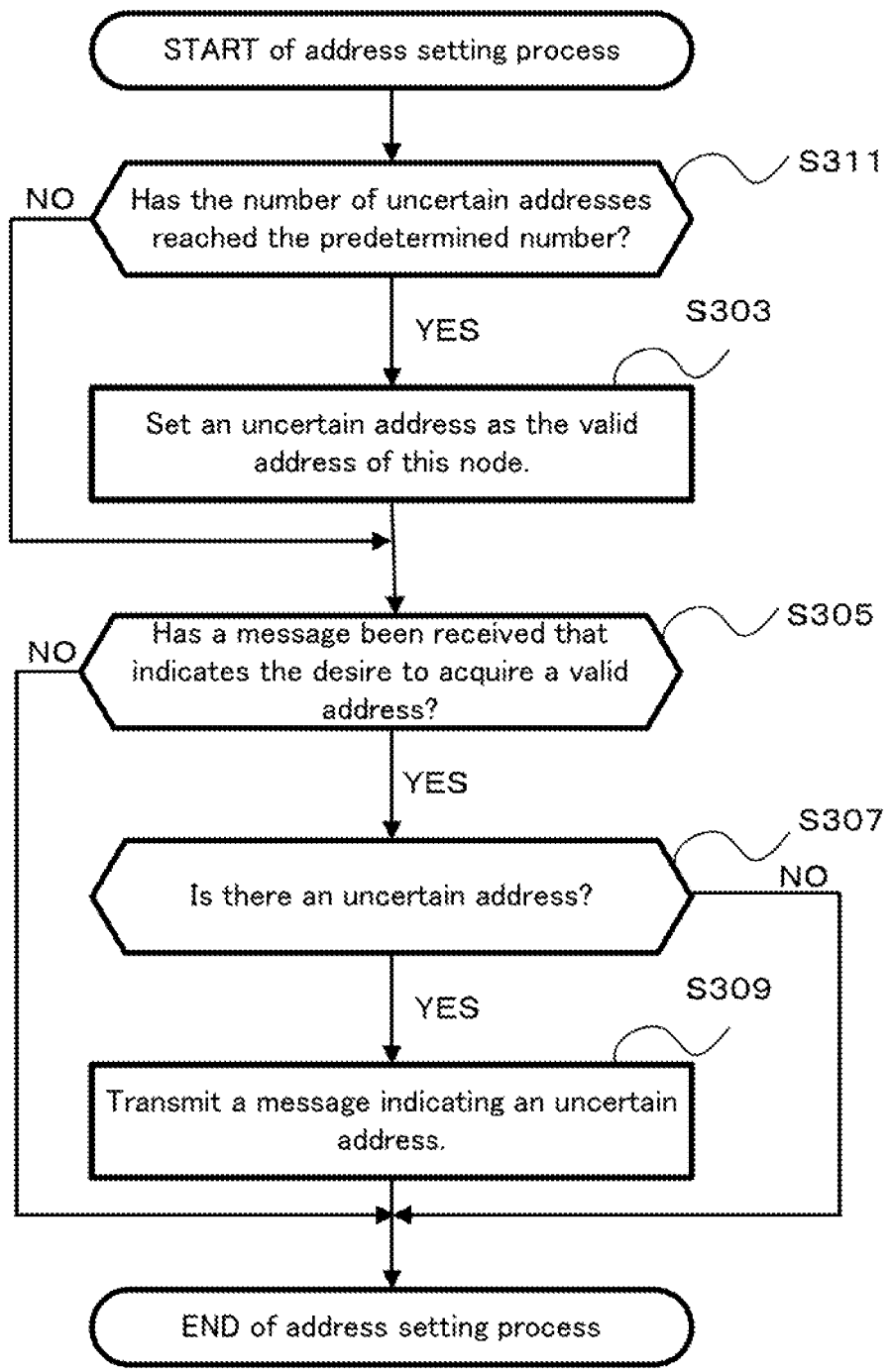
FIG. 27 is a flow chart showing the address setting process of the fourth exemplary embodiment.

FIG. 27 is a flow chart showing the address setting process executed by node 11 of the present exemplary embodiment. Referring to the figure, address setting unit 115 determines whether the number of uncertain addresses has reached a predetermined number (Step S311). If the number of uncertain addresses has reached the predetermined number (Step S311: YES), address setting unit 115 executes Step S303. If the number of uncertain addresses has not attained the predetermined number (Step S311: NO), address setting unit 115 executes Step S305.

For example, when the number of uncertain addresses has reached the number of nodes (11-14) in network N1 (Step S311: YES), preparations to function as a DHCP server have been completed and node 11 therefore starts leasing IP addresses (Step S309).

The operations of nodes 12-14 of the present exemplary embodiment are next described with reference to FIG. 28.

The operations of nodes 12-14 of the present exemplary embodiment are similar to the operations of nodes 12-14 of the first exemplary embodiment with the exception that Steps T307 and T309 are not executed in the return process shown in FIG. 16.

Figure 28:
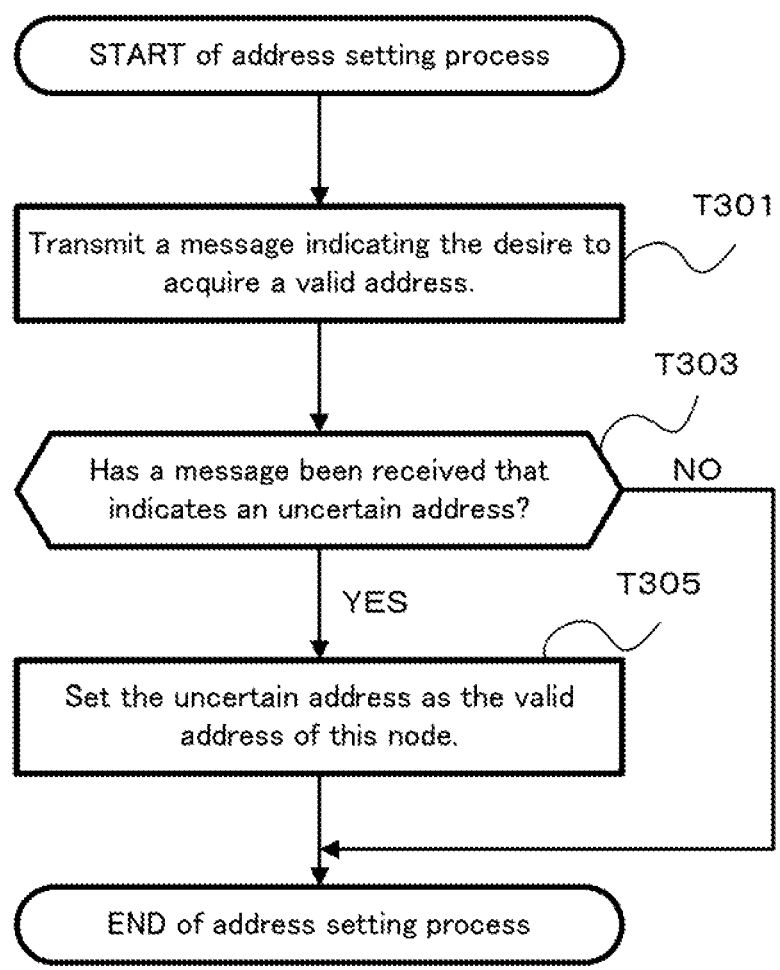
FIG. 28 is a flow chart showing the address setting process of the fourth exemplary embodiment.

FIG. 28 is a flow chart showing the address setting process that is executed by node 12 of the present exemplary embodiment. Referring to the figure, address setting unit 123 terminates the address setting process without determining the existence of duplicate addresses by means of Gratuitous ARP transmission (Step T307 and Step T309) even when a message indicating an uncertain address is not received within a predetermined time interval.

The operations of node 13 and node 14 are similar to the operations of node 12.

Node 11 thus leases IP addresses for which the non-existence of duplicate addresses has been previously confirmed, whereby nodes 12-14 can immediately set valid addresses without verifying the non-existence of duplicate addresses. Node 11 does not need to determine whether or not an NS message is for verification of duplicate addresses (Step S203) because nodes 12-14 do not verify the non-existence of duplicate addresses. As a result, each node in the communication system of the present exemplary embodiment is able to shorten the time interval up to setting of valid addresses.

In addition, a DHCP server may also be provided apart from nodes 11-14 of the present exemplary embodiment, and nodes 11-14 can be used as DHCP clients.

In addition, the communication apparatus of the above-described exemplary embodiment can also be applied to a DNS server that stores IP addresses in association with domain names, a Web server that carries out name resolution with the DNS server, and the clients of the DNS server and Web server.

Although the present invention has been described hereinabove with reference to exemplary embodiments, the present invention is not limited to these exemplary embodiments. The configuration and details of the present invention as defined in the claims are open to various modifications within the scope of the present invention that will be clear to one of ordinary skill in the art.

What is claimed is:

1. An address determination apparatus that determines a valid address that a communication apparatus that is connected to a network designates as the address at which a communication starts for indicating the origin of a transmission, the address determination apparatus comprising:
    memory unit that stores a plurality of IP addresses as invalid addresses;
    duplicate valid address determination unit that selects one of the invalid addresses that are stored in said memory unit as a tentative address and, by carrying out an inquiry on the network, determines the existence or absence of a valid address that duplicates the tentative address in said network and, when said duplicate valid address determination unit determines that a valid address that duplicates said tentative address does not exist, stores the tentative address in said memory unit as an uncertain address;
    address determination unit that, when said communication apparatus requests the address to begin communication that designates the address at which the communication originated, determines said uncertain address that has been stored in said memory unit before the request as a valid address that is designated as the address at which the transmission of the communication apparatus originates, wherein
    the uncertain address is an address state that is verified to be a unique address in the network among tentative addresses dynamically generated, and not yet set, thereby preventing nodes which are outside the network from communicating with nodes whose address is in the uncertain state, and
    the address determination apparatus operates over internet protocol version 6 (IPv6).

2. The address determination apparatus as set forth in claim 1, wherein said communication apparatus is said address determination apparatus.

3. The address determination apparatus as set forth in claim 2, further comprising a link layer address transmission unit that, when a valid address that is designated as the address at which the transmission of said address determination apparatus originates is determined by said address determination unit, and moreover, when a message is received that requests the link layer address of the address determination apparatus from another apparatus in said network, transmits to the other apparatus a message indicating the link layer address of the address determination apparatus.

4. An address determination apparatus as set forth in claim 1, further comprising:
    duplicate uncertain-address determination unit that, when a duplicate verification message is received from said other apparatus inquiring regarding the existence of a valid address that duplicates a tentative address selected by said other apparatus, determines whether said uncertain address stored in said memory unit duplicates the tentative address indicated in the duplication verification message; and
    duplicate message transmission unit that, when said duplicate uncertain-address determination unit determines that said uncertain address that is stored in said memory unit duplicates said tentative address indicated by said duplicate verification message, transmits a message indicating that a valid address exists that duplicates a tentative address indicated by the duplicate verification message in said network.

5. The address determination apparatus as set forth in claim 1, wherein said communication apparatus is another communication apparatus that is connected to said address determination apparatus by way of said network.

6. The address determination apparatus as set forth in claim 5, further comprising address transmission unit that, when a message requesting a valid address is received from said communication apparatus, transmits to the communication apparatus an address transfer message that indicates said valid address that was determined by said address determination unit.

7. The address determination apparatus as set forth in claim 6, further comprising:
    duplicate uncertain-address determination unit that, when a duplicate verification message is received from said communication apparatus inquiring about the existence of a valid address that duplicates a tentative address that is selected by said communication apparatus in said network, determines whether said uncertain address that is stored in said memory unit duplicates the tentative address indicated by the duplicate verification message;
    first duplication message transmission unit that, when said duplicate uncertain address determination unit has determined that said uncertain address that is stored in said memory unit duplicates said tentative address indicated by said duplicate verification message, transmits a message indicating that a valid address exists that duplicates the tentative address indicated by the duplicate verification message in said network; and
    second duplication message transmission unit that, when said address indicated by said address transfer message duplicates said tentative address indicated by said duplicate verification message, transmits a message indicating the existence of a valid address that duplicates said tentative address indicated by the duplicate verification message in said network from the transmission of said address transfer message by said address transmission unit until the receipt of a message indicating that a valid address has been set to said communication apparatus.

8. The address determination apparatus as set forth in claim 1, wherein said address determination apparatus is a DHCP server or a DHCP client.

9. The address determination apparatus as set forth in claim 1, wherein said address determination apparatus is a server or a client in a Web system.

10. A communication system that includes a communication apparatus connected to a network and an address determination apparatus that determines a valid address that the communication apparatus designates as the address at which a transmission originates; wherein:
   a memory unit stores a plurality of IP addresses as invalid addresses;
   said address determination apparatus selects one of the invalid addresses that are stored in said memory unit as a tentative address, determines whether or not there is a valid address in said network that duplicates the tentative address, and upon determining that there is no valid address that duplicates the tentative address, stores the tentative address in said memory unit as an uncertain address;
   said communication apparatus, when requests the address to begin communication that designates the address at which the transmission originates, transmits a message requesting a valid address to said address determination apparatus;
   said address determination apparatus, upon receiving a message requesting a valid address from said communication apparatus, determines said uncertain address that has been read from said memory unit before the request as the valid address that is set in said communication apparatus and transmits to said communication apparatus an address transfer message indicating the valid address; and
   said communication apparatus receives said address transfer message from said address determination apparatus and sets said valid address indicated by the address transfer message as the valid address designated as the address at which the transmission of the communication apparatus originates, wherein
   the uncertain address is an address state that is verified to be a unique address in the network among tentative addresses dynamically generated, and not yet set, thereby preventing nodes which are outside the network from communicating with nodes whose address is in the uncertain state, and
   the communication system operates over internet protocol version 6 (IPv6).

11. An address determination method that determines a valid address that a communication apparatus that is connected to a network designates as the address at which a communication starts for indicating the origin of a transmission, the address determination method comprising steps of:
   storing a plurality of IP addresses as invalid addresses;
   selecting one of the invalid addresses that are stored as a tentative address, and by carrying out an inquiry on said network, determining whether or not there is a valid address that duplicates the tentative address in said network;
   when it is determined that there is no valid address that duplicates said tentative address, storing the tentative address in a memory unit as an uncertain address; and
   when said communication apparatus requests the address to begin communication that designates the address at which the transmission originates, determining said uncertain address that has been stored in said memory unit before the request as the valid address designated as the address at which the transmission of the communication apparatus originates, wherein
   the uncertain address is an address state that is verified to be a unique address in the network among tentative addresses dynamically generated, and not yet set, thereby preventing nodes which are outside the network from communicating with nodes whose address is in the uncertain state, and
   the address determination method operates over internet protocol version 6 (IPv6).

12. A non-transitory recording medium storing a program that causes a computer to execute a process of determining a valid address that a communication apparatus that is connected to a network designates as the address at which a communication starts for indicating the origin of a transmission in communication, the program causing the computer to execute:
   a procedure for storing a plurality of IP addresses as invalid addresses in a memory unit;
   a duplicate address determination procedure of selecting one of the invalid addresses that are stored as a tentative address, and by carrying out an inquiry on said network, determining whether or not there is a valid address that duplicates the tentative address in said network;
   a procedure of, when it is determined by said duplicate address determination procedure that there is no valid address that duplicates said tentative address, storing the tentative address as an uncertain address in said memory unit; and
   an address determination procedure of, when said communication apparatus requests the address to begin communication that designates the address at which the transmission originates, determining the uncertain address that has been stored in said memory unit before the request as the valid address that is designated as the address at which the transmission of the communication apparatus originates, wherein
   the uncertain address is an address state that is verified to be a unique address in the network among tentative addresses dynamically generated, and not yet set, thereby preventing nodes which are outside the network from communicating with nodes whose address is in the uncertain state, and the recording medium operates over internet protocol version 6 (IPv6).

* * * * *